(12) United States Patent
Lee et al.

(10) Patent No.: US 9,958,984 B2
(45) Date of Patent: May 1, 2018

(54) DISPLAY DEVICE AND METHOD OF CONTROLLING THEREFOR

(71) Applicant: LG ELECTRONICS INC., Seoul (KR)

(72) Inventors: Juhyun Lee, Seoul (KR); Byoungzoo Jeong, Seoul (KR); Suyoung Lee, Seoul (KR); Sooyon Chung, Seoul (KR); Jeyeol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 14/975,343

(22) Filed: Dec. 18, 2015

(65) Prior Publication Data

US 2017/0003795 A1    Jan. 5, 2017

(30) Foreign Application Priority Data

Jul. 3, 2015  (KR) .......................... 10-2015-0095411

(51) Int. Cl.
   *G06F 3/041*  (2006.01)
   *G06F 3/0488* (2013.01)
   *G06F 3/0346* (2013.01)

(52) U.S. Cl.
   CPC .......... *G06F 3/0416* (2013.01); *G06F 3/0346* (2013.01); *G06F 3/0414* (2013.01); *G06F 3/04883* (2013.01); *G06F 3/04886* (2013.01); *G06F 2203/04803* (2013.01); *G06F 2203/04808* (2013.01)

(58) Field of Classification Search
   USPC ........................................ 345/173–174, 660
   See application file for complete search history.

(56) References Cited

U.S. PATENT DOCUMENTS

| | | | |
|---|---|---|---|
| 2002/0180763 A1* | 12/2002 | Kung | G06F 3/0481 345/660 |
| 2005/0223342 A1* | 10/2005 | Repka | G06F 3/0481 715/851 |
| 2008/0306683 A1* | 12/2008 | Ando | G01C 21/3664 701/431 |

(Continued)

FOREIGN PATENT DOCUMENTS

KR   10-2015-0074476 A   7/2015

*Primary Examiner* — Roy P Rabindranath
(74) *Attorney, Agent, or Firm* — Birch, Stewart, Kolasch & Birch, LLP

(57) ABSTRACT

A mobile terminal including a display including a touch recognizing layer configured to recognize a touch input; and a controller configured to display contents on the display, in response to a touch input equal to or greater than a first pressure being input on a first point of the displayed contents, set a first temporary area containing the first point, in response to a sweep touch input swept to a direction of the first temporary area from a second point of the displayed contents, set a first area containing the first point and a second area containing the second point based on the first temporary area and a moving direction of the sweep touch input, move the second area according to the direction of the sweep touch input, and display an overlap area of the second area overlapped with the first area on the display according to a moving distance of the second area using a predetermined scheme.

16 Claims, 29 Drawing Sheets

(a)                    (b)                    (c)

(56) References Cited

U.S. PATENT DOCUMENTS

| | | | |
|---|---|---|---|
| 2011/0242136 A1* | 10/2011 | Yamada | G01C 21/367 345/660 |
| 2012/0311482 A1 | 12/2012 | Kwak et al. | |
| 2014/0104197 A1 | 4/2014 | Khosravy et al. | |
| 2014/0118404 A1* | 5/2014 | Griffin | G06F 3/0481 345/660 |
| 2014/0191986 A1 | 7/2014 | Kim et al. | |
| 2014/0237422 A1 | 8/2014 | Ohlsson et al. | |
| 2014/0300569 A1 | 10/2014 | Matsuki et al. | |
| 2015/0051835 A1 | 2/2015 | Jung et al. | |

\* cited by examiner

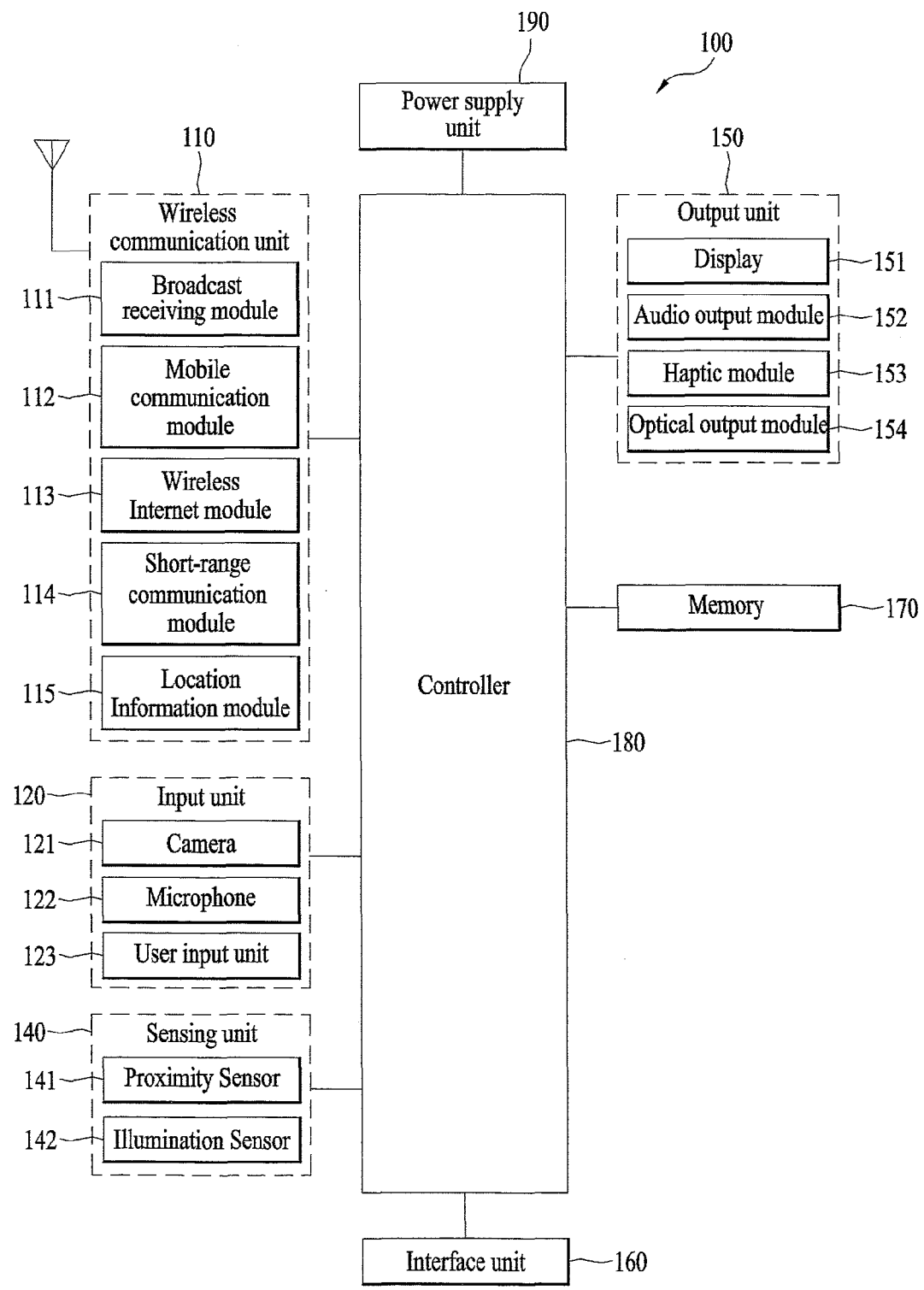

(a)  (b)

(a)  (b)

(a)  (b)

(a)  (b)

(a)  (b)

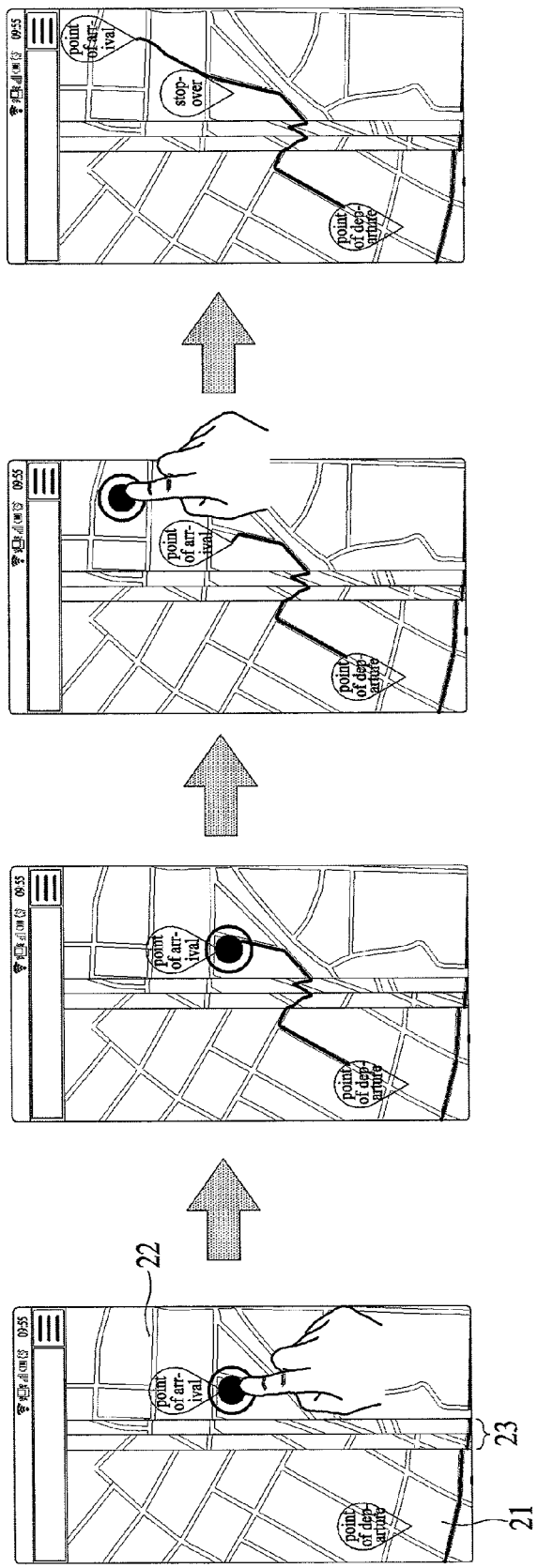

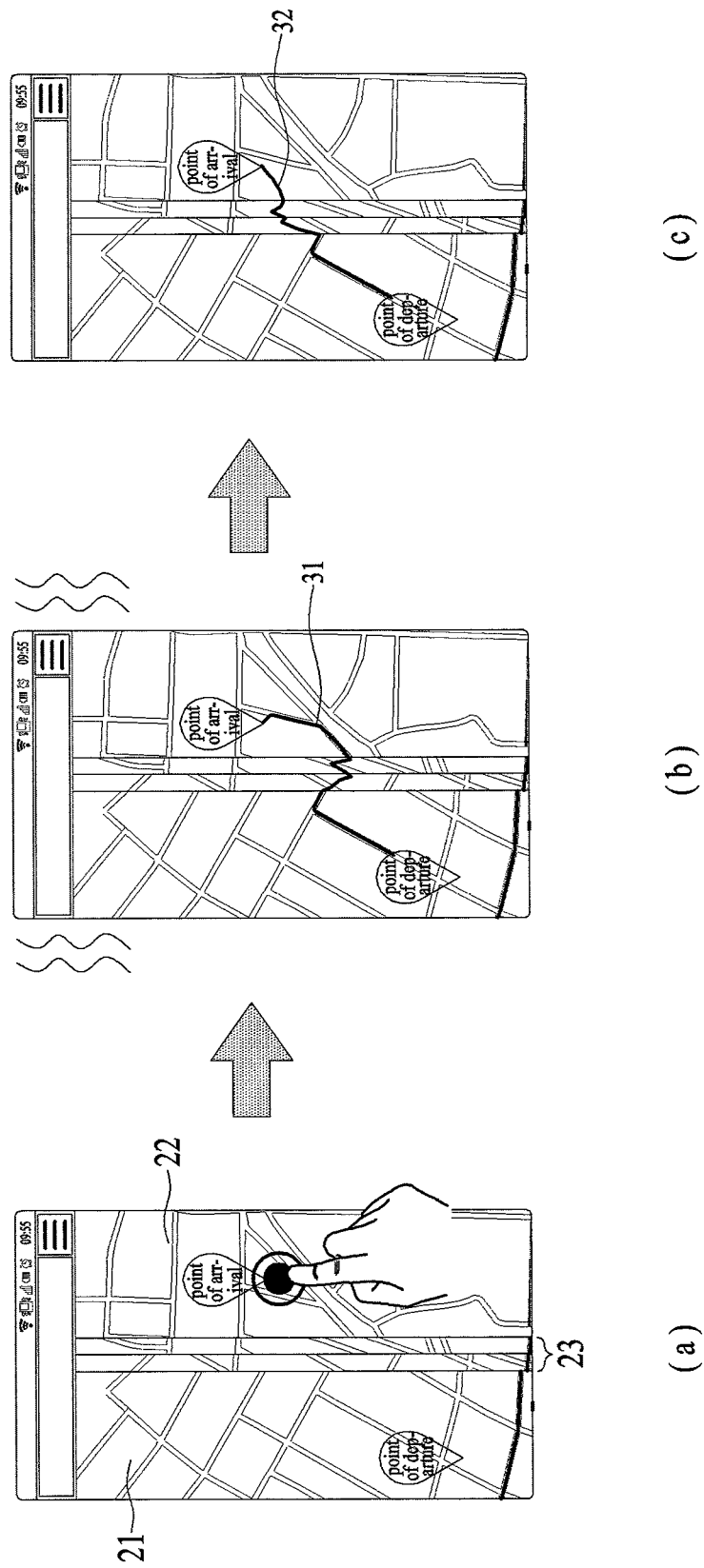

(a)  (b)

(a)　　　　　　　　　(b)

(a)  (b)

(a) (b)

(a) (b)

(a)            (b)

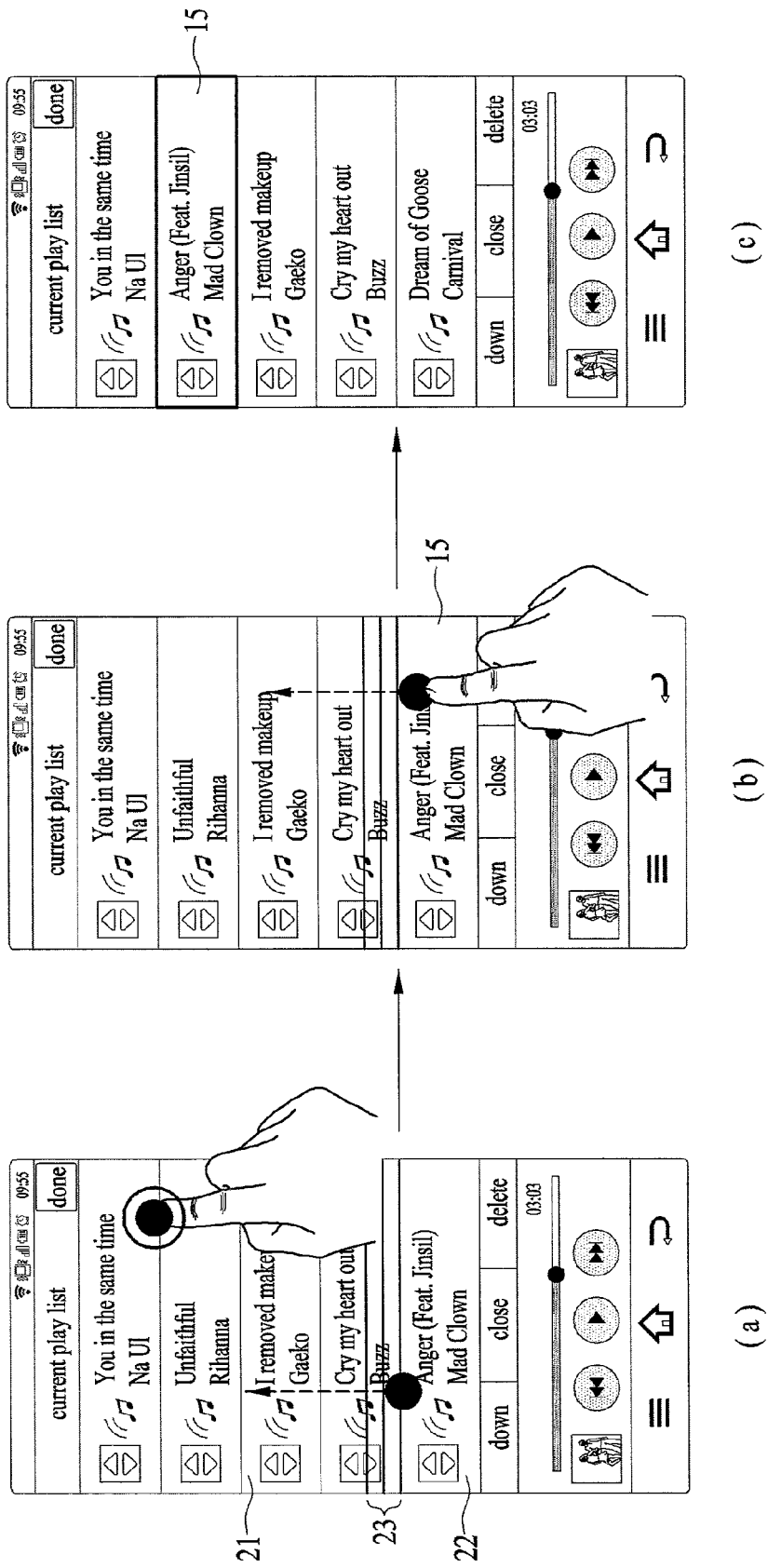

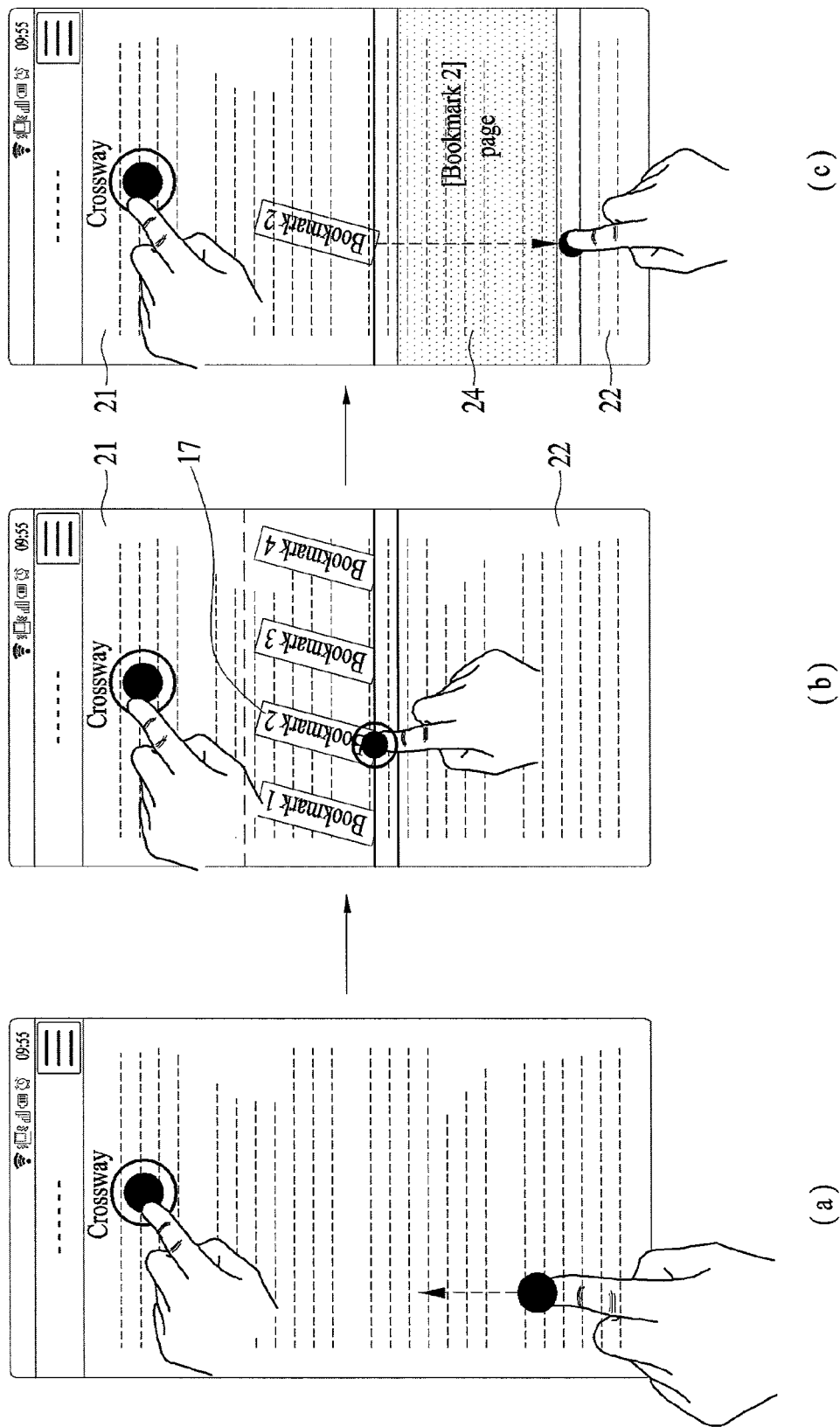

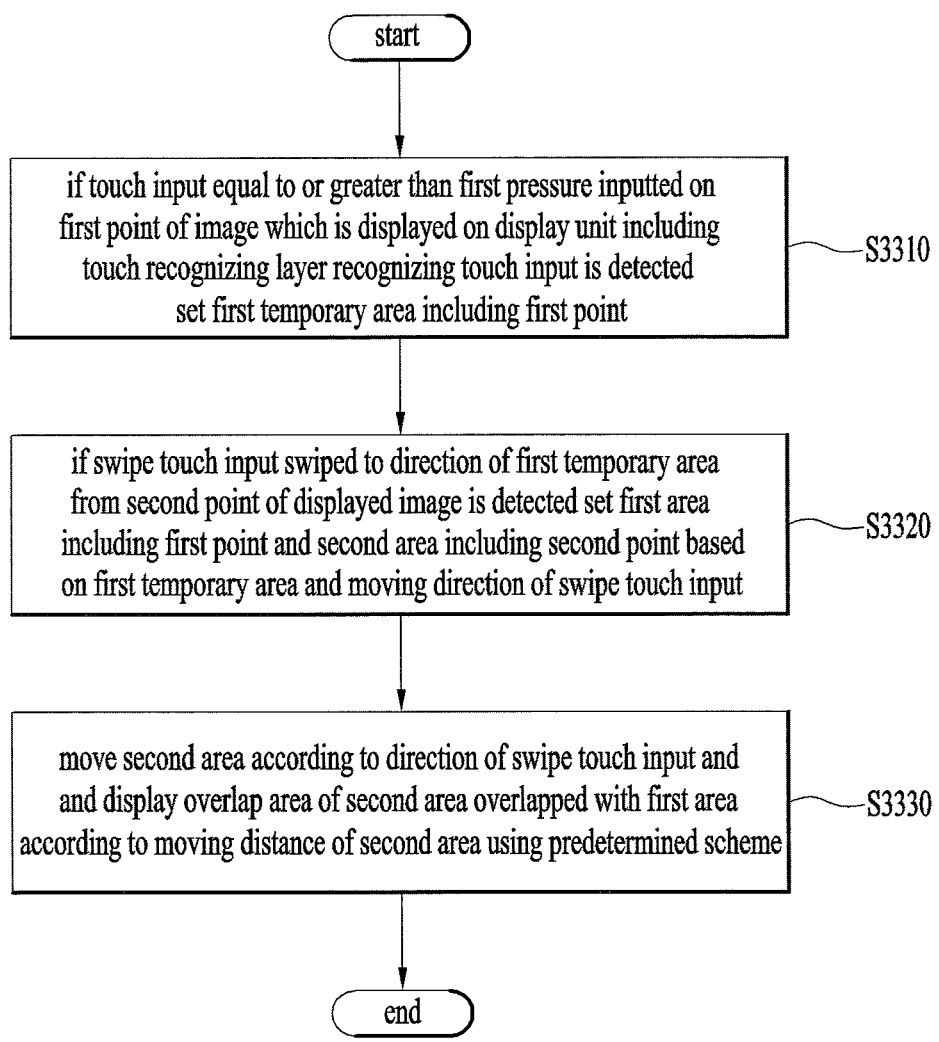

DISPLAY DEVICE AND METHOD OF CONTROLLING THEREFOR

This application claims the benefit of the Korean Patent Application No. 10-2015-0095411, filed on Jul. 3, 2015, which is hereby incorporated by reference as if fully set forth herein.

BACKGROUND OF THE INVENTION

Field of the Invention

The present invention relates to a display device and a method of controlling therefor.

Discussion of the Related Art

Generally, terminals can be classified into mobile terminals and stationary terminals according to a presence or non-presence of mobility. In addition, mobile terminals can be further classified into handheld terminals and vehicle mounted terminals.

A mobile terminal can perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

As the function of the terminal is diversified, the terminal is implemented in a form of a multimedia player equipped with complex functions including capturing a picture or a video, playing a music file or a video file, receiving broadcast, etc. for example. There are ongoing efforts to support and increase the functionality of mobile terminals. Such efforts include software and hardware improvements, as well as changes and improvements in the structural components which form the mobile terminal.

Further, a user can use various contents using a terminal. However, since all contents cannot be displayed on a single page, it is difficult for the user to see all content parts on a single screen.

SUMMARY OF THE INVENTION

Accordingly, one object of the present invention is to address the aforementioned problem and other problems of the related art.

Another object of the present invention is to provide a mobile terminal enabling a specific part of contents to be displayed on a single screen and a method of controlling therefor.

To achieve these objects and other advantages and in accordance with the purpose of the invention, as embodied and broadly described herein, the present invention provides in one aspect a mobile terminal including a display including a touch recognizing layer configured to recognize a touch input; and a controller configured to display contents on the display, in response to a touch input equal to or greater than a first pressure being input on a first point of the displayed contents, set a first temporary area containing the first point, in response to a sweep touch input swept to a direction of the first temporary area from a second point of the displayed contents, set a first area containing the first point and a second area containing the second point based on the first temporary area and a moving direction of the sweep touch input, move the second area according to the direction of the sweep touch input, and display an overlap area of the second area overlapped with the first area on the display according to a moving distance of the second area using a predetermined scheme.

In another aspect, the present invention provides a method of controlling a mobile terminal, and which includes displaying contents on a display including a touch recognizing layer configured to recognize a touch input; in response to a touch input equal to or greater than a first pressure being input on a first point of the displayed contents, setting, via a controller, a first temporary area containing the first point; in response to a sweep touch input swept to a direction of the first temporary area from a second point of the displayed contents, setting, via the controller, a first area containing the first point and a second area containing the second point based on the first temporary area and a moving direction of the sweep touch input; moving, via the controller, the second area according to the direction of the sweep touch input; and displaying an overlap area of the second area overlapped with the first area on the display according to a moving distance of the second area using a predetermined scheme.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 1A is a block diagram of a mobile terminal according to an embodiment of the present disclosure;

FIG. 11A is a diagram illustrating a method of searching for a moving path according to one embodiment of the present invention;

FIG. 12 is a diagram illustrating a method of searching for a moving path according to a different embodiment of the present invention;

FIG. 31 is a diagram illustrating a method of moving an item according to one embodiment of the present invention;

FIG. 32 is a diagram illustrating a method of displaying a bookmark area according to one embodiment of the present invention; and FIG. 33 is a flowchart for a method of controlling a display device according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
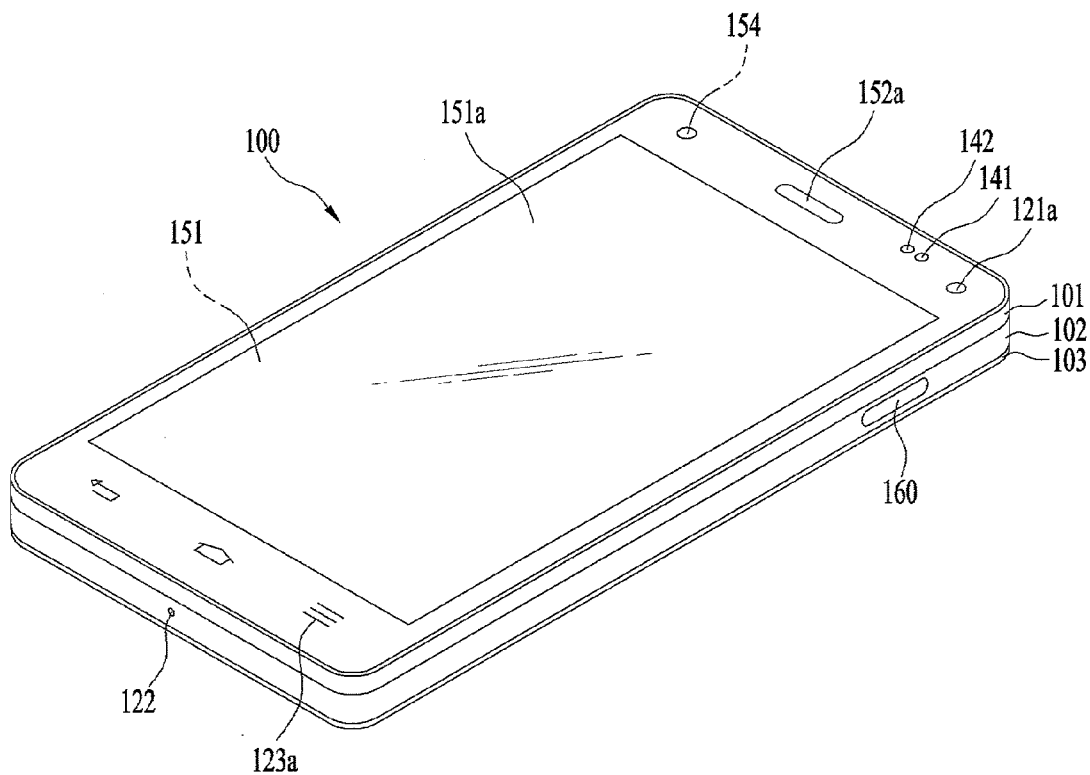
FIGS. 1B and 1C are conceptual views of one example of the mobile terminal, viewed from different directions.
Figure 1C:
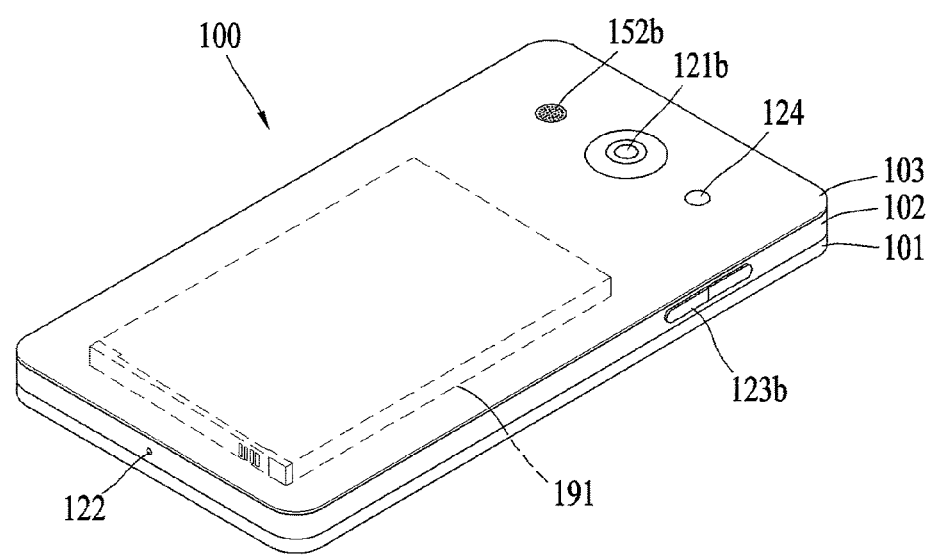

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display 151, an audio output module 152, a haptic module 153, and an optical output module 154. The display 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operations of the mobile terminal 100, in addition to the operations associated with the application programs. The controller 180 can process or provide appropriate information or function to a user by processing signals, data, information and the like input or output through the above-mentioned components or running application programs saved in the memory 170.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the above-mentioned components can cooperatively operate to embody operations, controls or controlling methods of the mobile terminal according to various embodiments mentioned in the following description. In addition, the operations, controls or controlling methods of the mobile terminal can be embodied on the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others. As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display 151 is generally configured to output information processed in the mobile terminal 100. For example, the display 151 can display execution screen information of an application program executing at the mobile terminal 100 or user interface (UI) and graphic user interface (GUI) information in response to the execution screen information. In some embodiments, the display 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100. An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

Further, a signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 can store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface. If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the display units 151 may be arranged on one side, either spaced apart from each other, or these devices may be integrated, or these devices may be arranged on different surfaces. The display 151 may also include a touch sensor which senses a touch input received at the display unit. When a touch is input to the display 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output. The first camera 121a can process image frames such as still or moving images obtained by the image sensor in a capture mode or a video call mode. The processed image frames can then be displayed on the display 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display 151, and the like. The rear input unit may be configured to permit touch input, a push input, or combinations thereof.

The rear input unit may be located to overlap the display 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of the mobile terminal 100 can sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
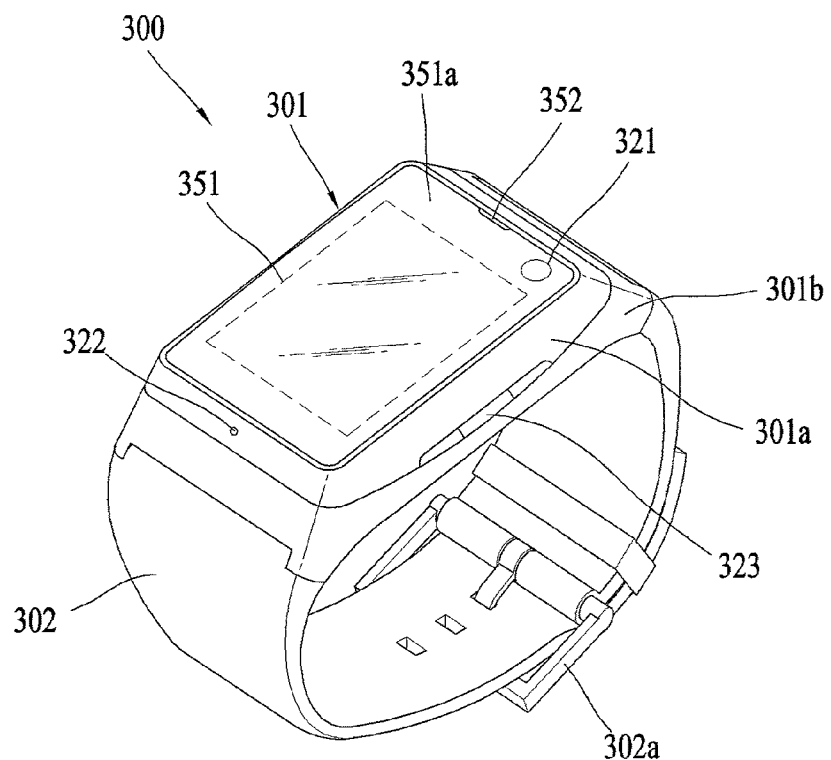
FIG. 2 is a perspective view illustrating one example of a watch-type mobile terminal according to another embodiment.

FIG. 2 is a perspective view illustrating one example of a watch-type mobile terminal 300 in accordance with another exemplary embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body. The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 3:
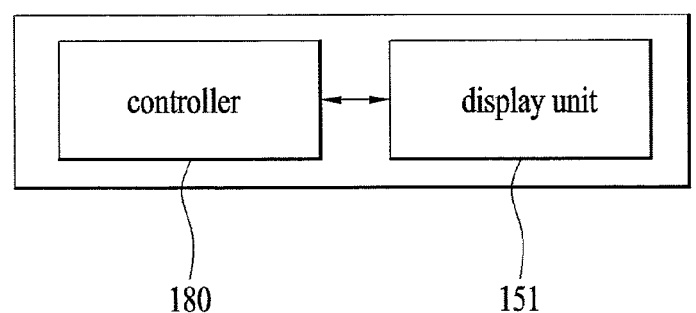
FIG. 3 is a block diagram illustrating a display device according to one embodiment of the present invention.

FIG. 3 is a block diagram illustrating a display device 100a according to one embodiment of the present invention. FIG. 3, the display device 100a can include a display 151 and a controller 180. The display 151 can display contents. In addition, the display 151 can be implemented by a touch recognizing layer and a touch sensitive display including a display panel. Hence, the display 151 displays contents and can receive a touch gesture input on a screen. The display device 100a can perform a command based on a touch command input on the display 151 and displayed contents.

The display device 100a can distinguish types of a touch command from each other based on pressure. For instance, the display device 100a can recognize a touch gesture less than predetermined pressure as a command for selecting a touched area. In addition, the display device 100a can recognize a touch gesture equal to greater than the predetermined pressure as an area distinction control command. The area distinction control command may correspond to a command for distinguishing a currently displayed screen into a first area and a second area by a single boundary line. The first area and the second area can be separately controlled.

For instance, a pressure of a touch gesture can be detected using a scheme described in the following. The display 151 of the display device 100a can include a touch recognizing layer capable of detecting a touch and a fingerprint recognizing layer capable of detecting a fingerprint. If a user touches the display by differentiating pressure, an image quality of a touched part may vary. For instance, if a user lightly touches the display 151, a touched part may be blurredly recognized.

On the contrary, if a user touches the display 151 by applying force to the display, a touched part can be clearly and deeply recognized. Hence, the display 151 including the fingerprint recognizing layer can recognize a touched part with image quality proportional to a touch pressure. The display device 100a can also detect a strength of a touched part according to image quality. Further, the display device 100a can recognize a touch gesture equal to or greater than the predetermined pressure.

In addition, the display device 100a can detect a strength of a touch pressure using a touched area recognized by the touch recognizing layer. If a user lightly pushes the display 151, the touched area may be relatively small. On the contrary, if the user strongly pushes the display, the touched area may be relatively big. The display device 100a can calculate a touch pressure using a relation between a touched area and pressure. Hence, the display device 100a can recognize a touch gesture equal to or greater than the predetermined pressure.

Further, the display device 100a can detect a pressure of a touch gesture using a piezoelectric element. The piezoelectric element corresponds to a device configured to detect a pressure or generate transformation/vibration using a piezoelectric effect. If mechanical stress (mechanical power or pressure) is given to a specific solid material and transformation occurs, polarization occurs in the inside of the solid material and electric charge is accumulated. The accumulated electric charge is shown as an electrical signal, i.e., voltage, at both electrodes of the material. This sort of phenomenon is called a piezoelectric effect, the solid material is called a piezoelectric material and the accumulated electric charge is called piezoelectricity.

The display device 100a can include a sensing unit including a layer consisting of piezoelectric materials capable of being driven by the piezoelectric effect. The sensing unit can detect an applied electric energy (a sort of electric signal, voltage) generated by a mechanical energy (power or pressure) and transformation due to the mechanical energy. The sensing unit can detect the applied mechanical power or pressure based on the detected voltage. Hence, the display device 100a can recognize a touch gesture equal to or greater than predetermined pressure.

As a different embodiment, the display device 100a can include three or more pressure sensors. The three or more pressure sensors can be installed in an area of the display area 151 by differentiating a layer or can be installed in a bezel area. If a user touches the display 151, a pressure sensor can sense a size of applied pressure. The strength of the pressure detected by the pressure sensor may be inversely proportional to a touch point and distance. In addition, the strength of the pressure detected by the pressure sensor may be proportional to touch pressure. The display device 100a can calculate a touch point and strength of actual touch pressure using strength of pressure detected by each pressure sensor. In addition, the display device 100a can detect a touch point by including a touch input layer configured to detect a touch input. The display device 100a can calculate strength of touch pressure of a touch point using a detected touch point and strength of pressure detected by each pressure sensor. Hence, the display device 100a can recognize a touch gesture equal to or greater than predetermined pressure.

As an embodiment, if a touch input equal to or greater than first pressure is input on a first point of displayed contents, the controller 180 can configure a first temporary area including the first point. The first temporary area may correspond to a reference area used for configuring a first area. The first temporary area may also not be displayed. If a sweep touch input swept to the first temporary area from a second point of the displayed contents is detected, the controller 180 can configure a first area including a first point and a second area including a second point based on the first temporary area and the moving direction of the sweep touch input. A sweep touch gesture may correspond to a gesture touching a display surface using such an object as a finger and the like and moving the touch in one direction while maintaining the touch of the object. The sweep touch gesture can include a touch and drag gesture, a swipe gesture, a flicking gesture and the like.

For instance, the first temporary area can be configured by a circle. In addition, a sweep gesture moving to a first point from a random point of a displayed screen can be input. If the sweep gesture is input, the controller 180 can configure a virtual line as a boundary line between a first area and a second area when the virtual line orthogonal to the moving direction of the sweep gesture becomes a tangent line of the first temporary area. In some instances, the controller 180 can configure a direction of the boundary line as a vertical line, a horizontal line or a diagonal line in advance. In this instance, the controller 180 can configure the first temporary area as the first area when the first temporary area is configured.

The controller 180 can move contents displayed on the second area according to direction of a sweep touch input. If a sweep touch gesture moves to the first area including the first point, an area adjacent to the first area among the contents displayed on the second area moves to the outside of the second area. In general, a terminal eliminates an area moving to the outside of a display area and adds a new area from an opposite direction. In particular, a terminal can display contents by moving the contents in one direction based on a displayed window. Further, according to an embodiment of the present invention, although the display device 100a moves the second area according to direction of a sweep touch input, the display device can display an overlap area of the second area overlapped with the first area in a prescribed scheme according to a moving distance of the second area.

The prescribed scheme of displaying the overlap area of the second area may correspond to displaying a partial image in the overlap area of the second area on the first area and a predetermined reduced area distinguished from the second area. The number of the reduced areas may vary according to the count of sweep touch gestures. For instance, if a sweep touch gesture is input 3 times and an overlap area of the second area occurs 3 times, the display device 100a can display 3 reduced areas. A reduced area may also be positioned between the first area and the second area. A plurality of reduced areas can have a form as creases of a curtain or a skirt. Hence, this scheme may also be called a crease scheme or a crease display.

In addition, the prescribed scheme of displaying the overlap area of the second area may correspond to reducing an image in the overlap area of the second area and displaying the reduced image on a predetermined reduced area. For instance, if content is moved in a horizontal direction, the overlap area of the second area is reduced according to a magnification and can be displayed on the predetermined reduced area. In this instance, a boundary part of the reduced area is relatively less reduced and a center part of the reduced area can be relatively a lot reduced. When a user gazes at the overlap area of the second area, the user can feel that the overlap area of the second area is curved and is concavely or convexly displayed. Hence, a scheme of reducing an image and displaying the reduced image on a predetermined reduced area can be called a curved scheme or a curved display.

Figure 4:
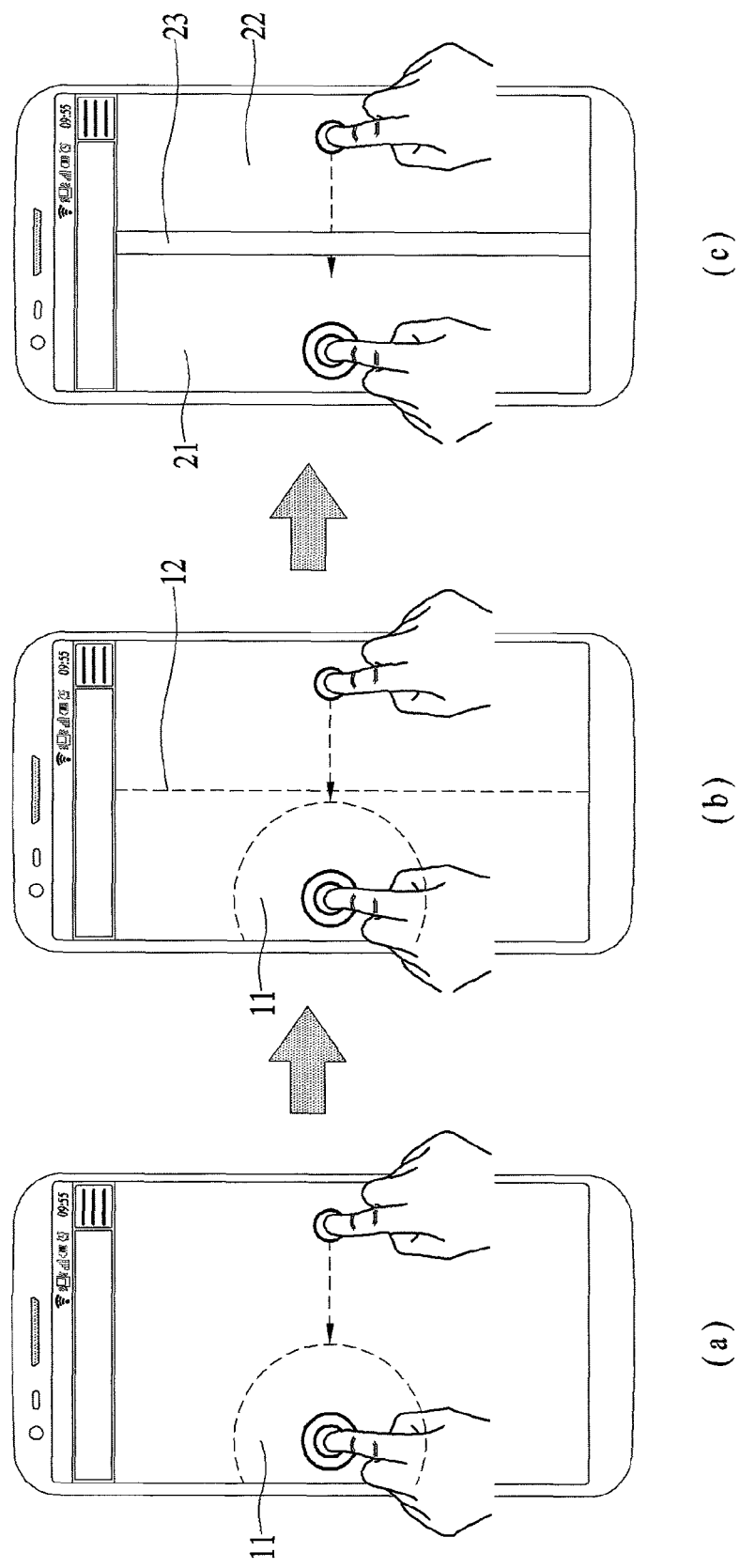
FIG. 4 is a diagram illustrating a process of configuring an overlapped area according to one embodiment of the present invention.

Next, FIG. 4 is a diagram illustrating a process of configuring an overlapped area according to one embodiment of the present invention. In particular, in FIG. 4(a), the display device 100a can detect a touch input touching a first point equal to or greater than first pressure. If the display device 100a detects the touch input touching the first point with pressure equal to or greater than the first pressure, the display device 100a can configure a first temporary area 11 based on the first point. As shown, the first temporary area may correspond to a circle. The display device can also detect a sweep touch gesture moving to the first point from a second point.

In particular, FIG. 4 (b) illustrates the display device, which has configured a boundary line 12. If the display device detects a sweep touch gesture moving to the first point from a second point, the display device can configure the boundary line 12 separating the first area from the second area. The boundary line 12 can be configured by a tangent line drawn at a point where the direction of the sweep touch gesture and the first temporary area 11 are in contact. As shown in FIG. 4 (b), if the sweep touch gesture moves in a horizontal direction, a tangent line for the first temporary area 11 may correspond to a vertical line. Hence, the boundary line 12 becomes a vertical line and the first area and the second area can be separated from each other in left and right based on the vertical line.

If the sweep touch gesture moves in a vertical direction, a tangent line for the first temporary area 11 may correspond to a horizontal line. Hence, the boundary line 12 becomes a horizontal line and the first area and the second area can be separated from each other in up and down based on the horizontal line. If the sweep touch gesture moves in diagonal direction, the first temporary area 11 may become diagonal direction orthogonal to a moving direction of the sweep touch gesture.

FIG. 4 (c) illustrates a first area 21, a second area 22 and an overlap area 23 of the second area. The display device can configure the first area 21 and the second area 22 according to FIG. 4 (b). In addition, the display device moves contents displayed on the second area according to a moving direction of a sweep touch gesture touching a second point. A process of moving the contents displayed on the second area according to the sweep touch gesture is identical to an operation of a general sweep touch gesture.

Further, there is a difference for the overlap area 23 of the second area. If the second area moves to a direction of the first area, a moved part of the second area is overlapped with the first area. The moved part of the second area overlapped with the first area corresponds to the overlap area 23 of the second area. In addition, the display device can display the overlap area of the second area on the first area 21 or a predetermined reduced area distinguished from the second area 22 instead of deleting the overlap area 23 of the second area. If a sweep touch gesture moving to an identical direction is received again, the display device can display the moved part of the second area overlapped with the first area on a predetermined reduced area by adding the predetermined reduced area.

Figure 5:
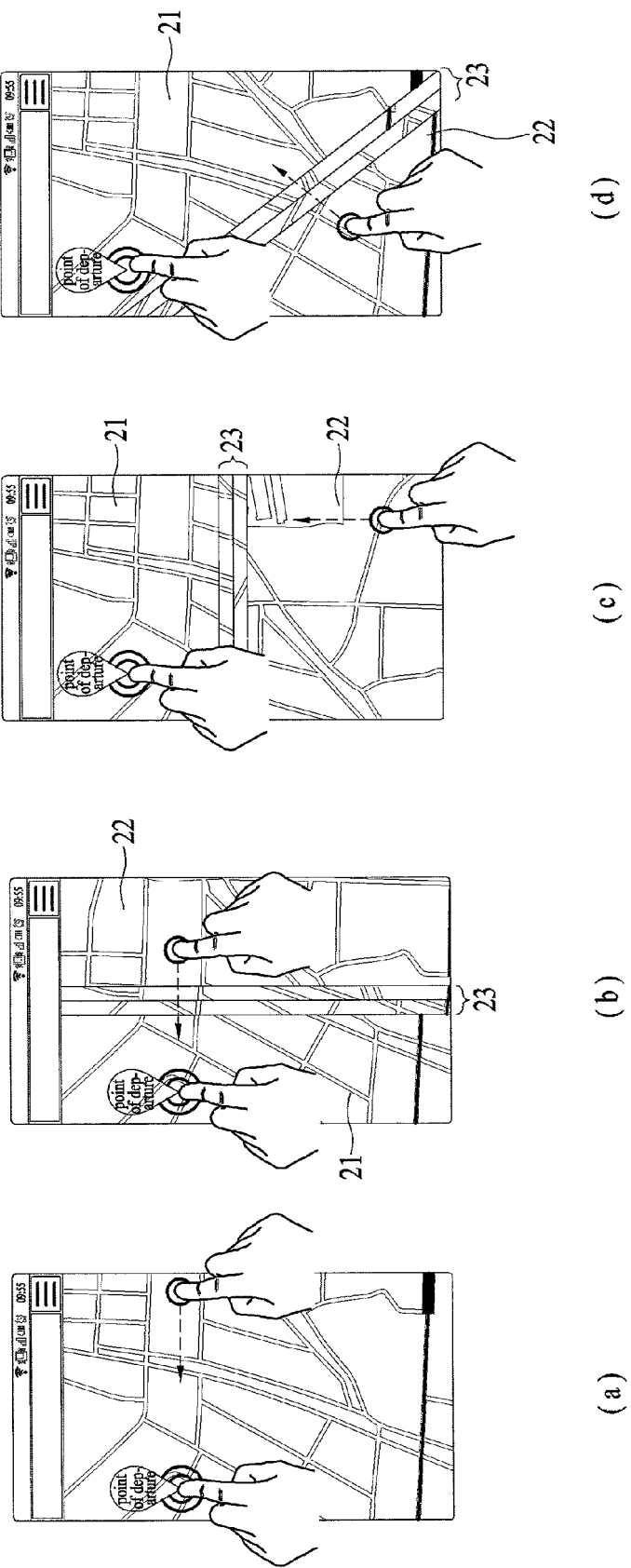
FIG. 5 is a diagram illustrating a boundary line of an overlapped area according to one embodiment of the present invention.

Next, FIG. 5 is a diagram illustrating a boundary line of an overlap area according to one embodiment of the present invention. FIG. 5 shows various embodiments for configuring the first area 21 and the second area 22. FIG. 5 (a) also illustrates map contents in this embodiment.

The display device can receive a touch gesture input equal to or greater than predetermined pressure input on a random first point. If the touch gesture equal to or greater than the predetermined pressure is input on the first point on a map image, the display device can configure the first point as a point of departure. Subsequently, the display device can receive a sweep touch gesture moving to a direction of the first point or a first temporary area from a random second point. As mentioned in the foregoing description, the first area 21 and the second area 22 can be configured based on the moving direction of the sweep touch gesture and the first temporary area.

FIG. 5 (b) illustrates the display device of which the first area 21 and the second area 22 are separated from each other in a vertical direction. If a sweep touch gesture moves in a horizontal direction, the display device can configure the first area 21 and the second area 22 using a boundary line corresponding to a vertical line orthogonal to the moving direction of the sweep touch gesture. Subsequently, the display device can display a partial image within an overlap area of the second area on the first area 21 and a predetermined reduced area 23 distinguished from the second area 22 according to the sweep touch gesture.

The partial image within the overlap area of the second area may correspond to a partial image of an overlapped area. For instance, the second area 22 may move to the left as much as 3 cm according to a sweep touch gesture. Hence, a previously displayed left 3 cm of the second area 22 may be overlapped with the first area and a new image can be displayed on a part of the right 3 cm. In addition, the predetermined reduced area 23 can be displayed by 1 cm. Further, it is unable to display the whole of the left 3 cm of the second area overlapped with the first area on the predetermined reduced area 23. Hence, 1 cm among the left 3 cm of the second area 22 overlapped with the first area can be displayed on the predetermined reduced area 23 only. Thus, a partial image within the overlap area of the second area can correspond to an image displayed on the predetermined reduced area 23.

In addition, the predetermined reduced area 23 can be generated based on a sweep touch gesture moving to the first area 21. Hence, the number of predetermined reduced area 23 can be proportional to the count of the sweep touch gesture moving to the first area 21. For example, FIG. 5 (c) illustrates the display device of which the first area 21 and the second area 22 are separated from each other in a horizontal direction. If a sweep touch gesture moves in a vertical direction, the display device can configure the first area 21 and the second area 22 using a boundary line corresponding to a horizontal line orthogonal to the moving direction of the sweep touch gesture.

Subsequently, the display device can display a partial image within an overlap area of the second area on the first area 21 and a predetermined reduced area 23 distinguished from the second area 22 according to the sweep touch gesture. The predetermined reduced area 23 can be generated based on a sweep touch gesture moving to the first area 21. Hence, the number of predetermined reduced area 23 can be proportional to the count of the sweep touch gesture moving to the first area 21.

FIG. 5 (d) illustrates the display device of which the first area 21 and the second area 22 are separated from each other in a diagonal direction. If a sweep touch gesture moves in an upper right direction, the display device can configure the first area 21 and the second area 22 using a boundary line corresponding to a diagonal line orthogonal to the moving direction of the sweep touch gesture. Subsequently, the display device can display a partial image within an overlap area of the second area on the first area 21 and a predetermined reduced area 23 distinguished from the second area 22 according to the sweep touch gesture. In addition, the controller 180 can generate a plurality of the predetermined reduced areas 23 based on a sweep touch gesture.

Figure 6:
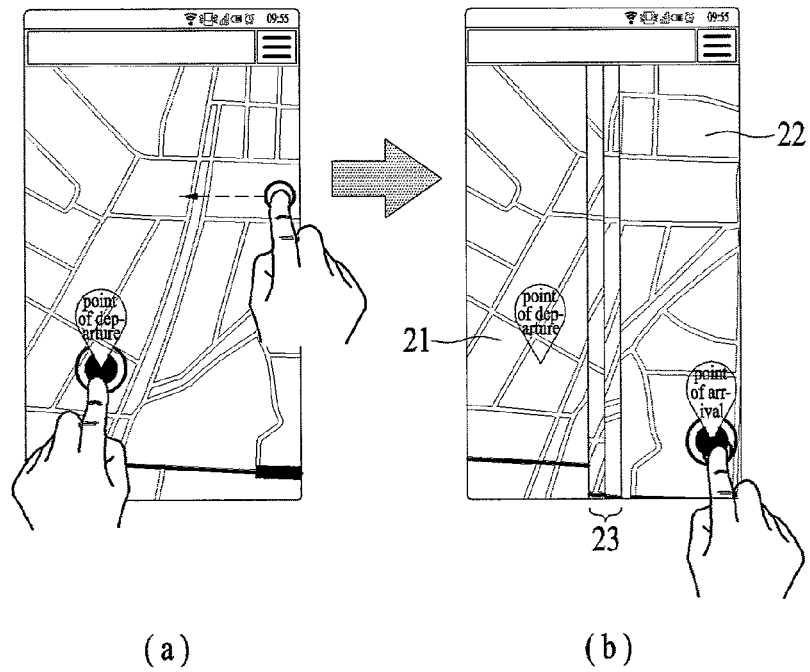
FIG. 6 is a diagram illustrating a specific area of a first area and a second area displayed on a single screen according to one embodiment of the present invention.

Next, FIG. 6 is a diagram illustrating a specific area of a first area and a second area displayed on a single screen according to one embodiment of the present invention. FIG. 6 (a) illustrates a display device of which a touch gesture equal to or greater than predetermined pressure is input on a first point. As mentioned in the foregoing description, if the touch gesture equal to or greater than the predetermined pressure is input on the first point of map contents, the display device can configure the first point as a point of departure. Subsequently, the display device can receive a sweep touch gesture input heading to the first point from a second point.

FIG. 6 (b) illustrates a display device to which a destination (or a point of arrival) is set. The display device can configure a first area 21, a second area 22 and an overlap area 23 of the second area based on a touch gesture equal to or greater than predetermined pressure input on a first point and a sweep touch gesture. The display device can configure the number of the overlap area 23 of the second area in proportion to the count of the sweep touch gesture. The display device can configure the overlap area 23 of the second area in various ways. For instance, the display device can configure a single overlap area 23 by a prescribed size. In particular, the display device can configure a length of 10 km as a single overlap area 23 on a map. Hence, two overlap areas 23 mean 20 km and three overlap areas 23 may mean 30 km. Hence, a user can easily determine a length of an overlap area according to the number of overlap areas 23.

In addition, the display device can display a single overlap area 23 irrespective of the count of sweep touch gestures. In this instance, the display device can display a length of the overlap area by color. As an embodiment, the display device can display an overlap area of 10 km and an overlap area of 20 km by a yellow color and a green color, respectively. Further, the display device can control a width of an overlap area according to a length on a map. As an embodiment, if a length on a map is less than 20 km, the width of the overlap area is configured by a width of 0.5 cm. If the length on the map is less than 40 km, the width of the overlap area is configured by a width of 1 cm. If the length on the map is less than 60 km, the width of the overlap area can be configured by a width of 1.5 cm.

If a user inputs a sweep touch input on the second area, a region preferred by the user on a map can be displayed on the second area. In particular, in order to perform such a prescribed function as a route search and the like, the display device displays a point of departure and a point of arrival with a size equal to or greater than a prescribed size. However, if the point of departure and the point of arrival are far away from each other, the display device is unable to display the point of departure and the point of arrival at the same time with the size equal to or greater than the prescribed size. In addition, if the user sets the point of departure and then searches for the point of arrival, the point of departure disappears from the display. This is inconvenient for the user to see or change the point of departure.

However, as shown in FIG. 6 (b), if the overlap area 23 of the second area is configured, the point of departure and the point of arrival can be displayed on a single screen. In addition, the user can configure the point of arrival by touching a random point of the second area with pressure equal to or greater than predetermined pressure. The user can also change the point of departure by touching a different point of the first area with a pressure equal to or greater than a first pressure. The display device can thus configure the point of departure and the point of arrival or change the point of departure via the aforementioned process.

Figure 7:
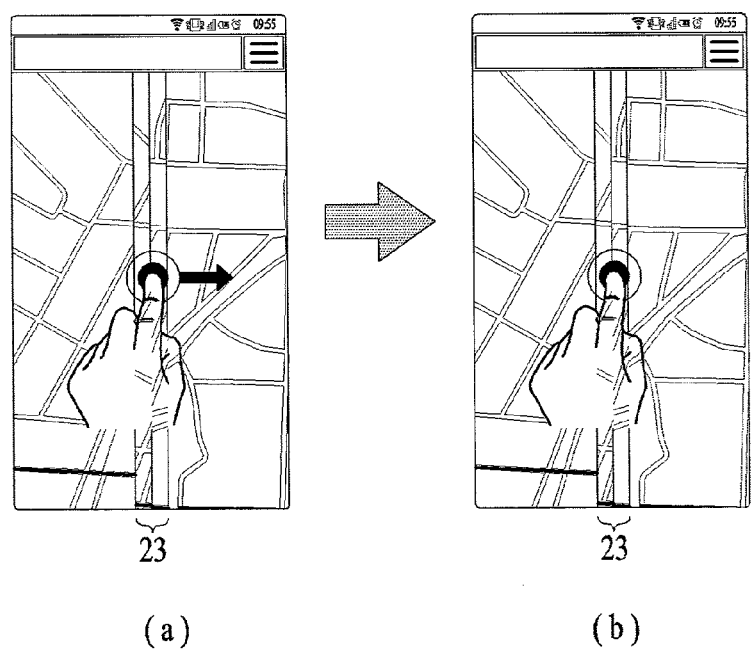
FIG. 7 is a diagram illustrating a method of controlling area of a first area and a second area according to one embodiment of the present invention.

Next, FIG. 7 is a diagram illustrating a method of controlling area of a first area and a second area according to one embodiment of the present invention. In particular, FIG. 7 (a) illustrates a display device on which an overlap area 23 is displayed. As mentioned in the foregoing description, the display device can generate the overlap area 23 of the second area according to a sweep touch gesture. The display device can also receive a touch gesture equal to or greater than predetermined pressure input on the overlap area.

FIG. 7 (b) illustrates a display device of which a displayed region is changed. If a touch gesture equal to or greater than predetermined pressure is input on the overlap area 23 and the touch gesture moves, the display device can change a displayed region. In particular, if the touch gesture moves to a direction of a second area, a region displayed on the second area is displayed on a first area and a region located at the right of the first area can be displayed on the overlap area and the second area. In particular, if the touch input equal to or greater than the predetermined pressure input on the overlap area 23 moves, the controller 180 can move the whole of the displayed region.

In addition, the touch gesture equal to or greater than the predetermined pressure input on the overlap area 23 can perform a different operation. For instance, if the touch gesture equal to or greater than the predetermined pressure is input on the overlap area 23 and moves, the controller 180 can move the overlap area 23. In particular, if a sweep touch input input on the overlap area 23 and movement of the touch input are detected, the display device can move the overlap area 23 based on a moving direction of the sweep touch input. Hence, the display device can control area of the first and the second area.

Figure 8:
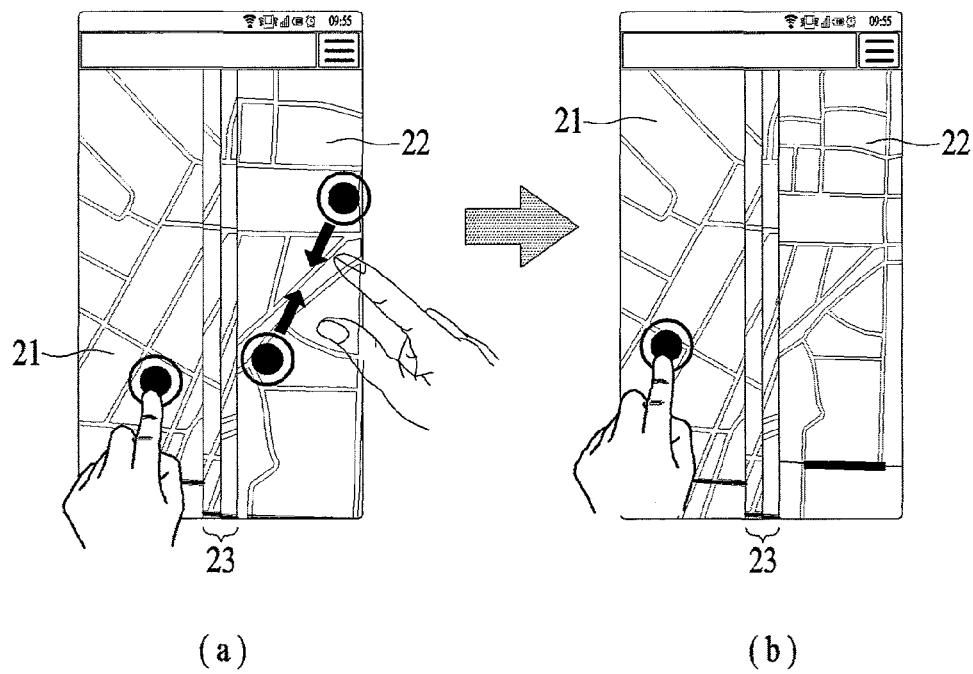
FIG. 8 is a diagram illustrating a first area and a second area, which are separately controlled according to one embodiment of the present invention.

Next, FIG. 8 is a diagram illustrating a first area and a second area, which are separately controlled according to one embodiment of the present invention. In particular, FIG. 8 (a) illustrates a display device on which a first area 21, a second area 22 and an overlap area 23 are displayed. If the first area 21 and the second area 22 are configured, the display device can individually control the first area 21 and the second area 22, respectively. In particular, a user inputs a touch gesture on the first area 21 with a pressure equal to or greater than a predetermined pressure and can input a pinch-in gesture on the second area 22. The pinch-in gesture may correspond to a gesture touching two points and moving the two points to make the two points to be adjacent to each other.

Further, FIG. 8 (b) illustrates the display device of which the second area 22 is zoomed-out in response to the pinch-in gesture. The display device can detect the touch gesture equal to or greater than the predetermined pressure input on the first area 21 and the pinch-in gesture input on the second area 22. The display device can display the second area 22 by zooming out the second area without changing the first area 21 in response to the input gesture. The display device can also detect a touch gesture equal to or greater than the predetermined pressure input on the second area 22 and a pinch-in gesture input on the first area 21.

In this instance, the display device can display the first area 21 by zooming out the first area without changing the second area 22. In particular, if a pinch-in touch input input on at least one of the first area 21 and the second area 22 is detected, the display device can zoom out contents of the area in which the pinch-in touch input is detected. If a pinch-in gesture is input without receiving an input of a touch gesture equal to or greater than the predetermined pressure, the display device can zoom out all areas. In particular, the display device can individually control each area by a combination of a touch gesture equal to or greater than the predetermined pressure and a pinch-in gesture input on a specific area.

Further, as a different embodiment, the display device can perform a zoom-out operation with a pinch-in gesture only without a touch gesture input equal to or greater than the predetermined pressure. In particular, if a pinch-in gesture is input on the first area 21, the display device can zoom out the first area 21. If a pinch-in gesture is input on the second area 22, the display device can zoom out the second area 22. In particular, the display device can individually control each area using a pinch-in gesture input on a specific area only.

Figure 9:
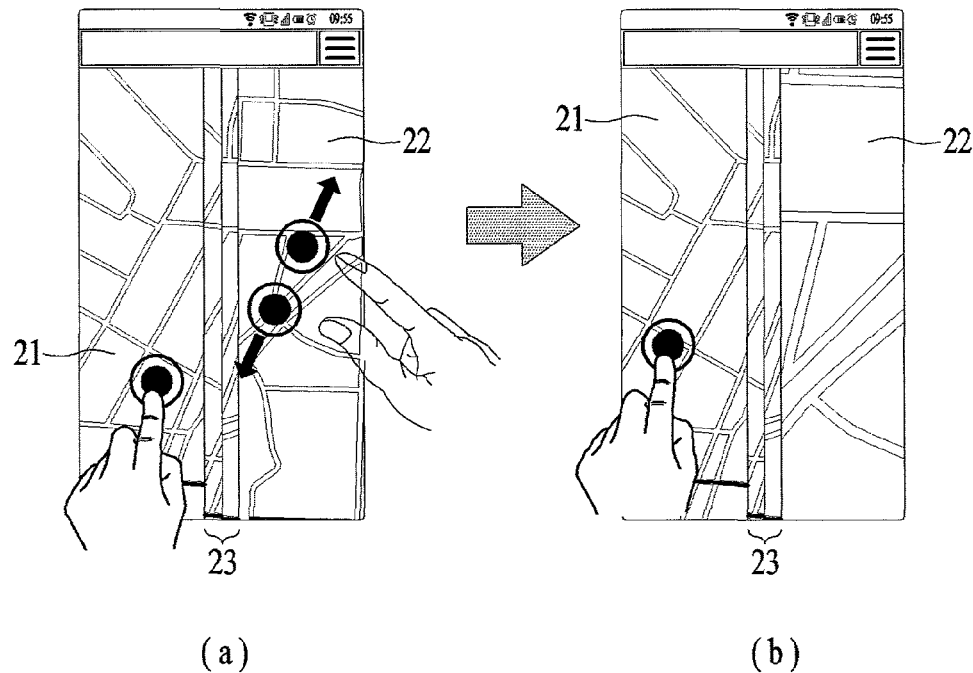
FIG. 9 is a diagram illustrating a first area and a second area, which are separately controlled according to a different embodiment of the present invention.

FIG. 9 is a diagram illustrating a first area and a second area, which are separately controlled according to a different embodiment of the present invention. In particular, FIG. 9 (a) illustrates a display device on which a first area 21, a second area 22 and an overlap area 23 are displayed. A user can input a touch gesture equal to or greater than predetermined pressure on the first area 21 and can input a pinch-out gesture on the second area 22. The pinch-out gesture may correspond to a gesture touching two points and expanding the two points. FIG. 9 (b) illustrates the display device of which the second area 22 is zoomed-in in response to the pinch-out gesture. An operation explained in FIG. 9 corresponds to an operation mentioned earlier in FIG. 8. In particular, there is a difference in that an area on which a pinch-out gesture is input is zoomed-in instead.

As mentioned earlier in FIG. 8, the display device can individually control each area by a combination of a touch gesture equal to or greater than predetermined pressure and a pinch-out gesture input on a specific area. In this instance, if the pinch-out gesture is input without receiving the touch gesture input equal to or greater than the predetermined pressure, the display device can zoom-out all areas. In addition, as a different embodiment, the display device can individually control each area by the pinch-out gesture only input on the specific area.

Figure 10:
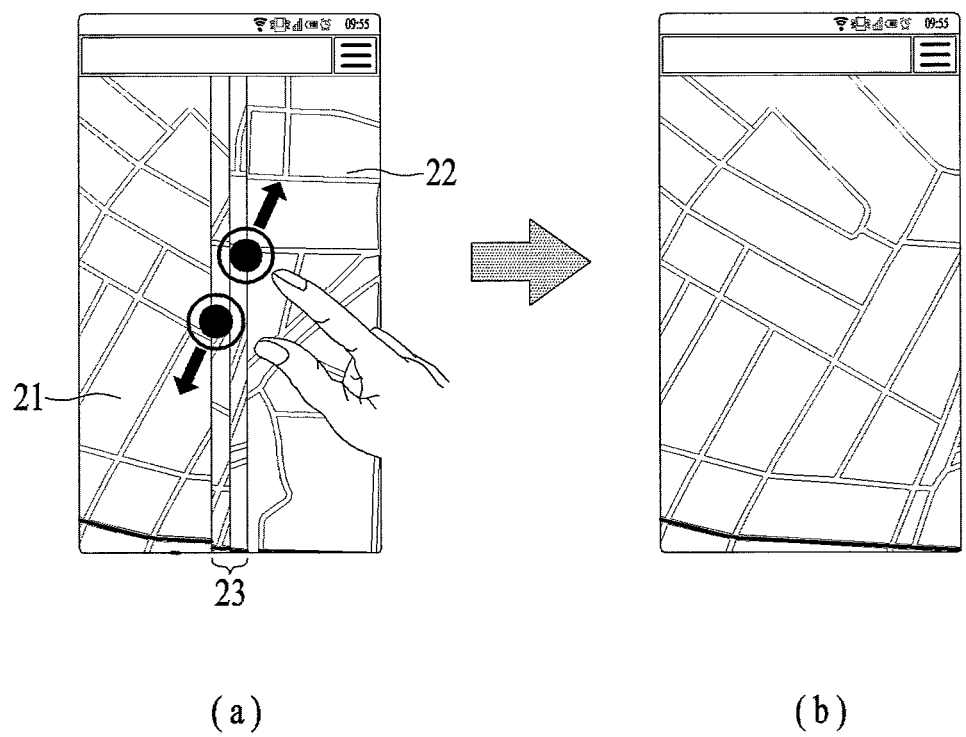
FIG. 10 is a diagram illustrating a method of unfolding an overlapped area according to one embodiment of the present invention.

Next, FIG. 10 is a diagram illustrating a method of unfolding an overlapped area according to one embodiment of the present invention. In particular, FIG. 10 (*a*) illustrates a display device on which a first area 21, a second area 22 and an overlap area 23 are displayed. A user can input a pinch-out gesture on the overlap area 23.

FIG. 10 (*b*) illustrates a display device on which an original map screen is displayed. The display device can detect the pinch-out gesture input on the overlap area 23. In general, the pinch-out gesture may correspond to a gesture for expanding a screen. The display device can expand the overlap area 23 in response to the pinch-out gesture input on the overlap area 23. Hence, the display device unfolds the overlap area and can display a general content screen. In particular, if the pinch-out gesture is input on the overlap area 23 of the second area, the display device can perform an operation of unfolding the overlap area 23 of the second area.

Next, FIG. 11A is a diagram illustrating a method of searching for a moving path according to one embodiment of the present invention. In particular, FIG. 11A (a) illustrates a display device to which a point of departure and a destination (or a point of arrival) are set. The display device can configure a first area 21, a second area 22 and an overlap area 23 by performing the aforementioned various processes. In addition, if a touch gesture equal to or greater than predetermined pressure input on the first area 21 is detected, the display device can configure a first point on which the touch gesture is input as a point of departure. Further, a user can input a touch gesture equal to or greater than the predetermined pressure on a specific point of the second area 22.

If a point of departure or a point of arrival is selected, the display device can automatically change a scale of a map. For instance, a user generally makes a surrounding of a point of departure to be positioned at the center of a screen of a zoomed out map and selects the point of departure by zoom-in the map. In addition, the user zoom-out of the map again makes a surrounding of a point of arrival to be positioned at the center of the screen and selects the point of arrival by zoom-in the map. Hence, if the point of departure is selected, the display device can make the map displayed on the screen to be automatically zoomed out. In addition, if the point of arrival is selected, the display device can make the second area 22 including the point of arrival to be automatically zoomed out.

FIG. 11A (b) illustrates a display device on which a moving path is displayed. If a touch gesture equal to or greater than predetermined pressure input on a specific point of a second area 22 is detected, the display device can configure a second point on which the touch gesture is input as a point of arrival. If a point of departure and a point of arrival are configured, the display device can calculate a moving path and display the moving path on a screen. Further, the display device can automatically change a scale of the first area 21 and a scale of the second area 22.

In addition, the display device can change the scale of the first area 21 and the scale of the second area 22, respectively. For instance, the point of departure is included in the first area 21 and the point of arrival can be included in the second area 22. Further, the searched moving path is simply displayed at a point near the point of departure and can be displayed in detail at a point near the point of arrival. The display device can automatically zoom-out a map of the first area 21 and zoom-in a map of the second area 22.

The display device can display the moving path while maintaining the displayed overlap area 23. If the display device receives a pinch-out gesture on the overlap area 23, the display device can display the moving path on an unfolded map. FIG. 11A (c) illustrates a display device on which a command for selecting a new point is input. The display device can receive a touch gesture input equal to or greater than predetermined pressure input on a new third point of a screen on which a moving path is displayed. The display device can configure the third point as a destination or a stopover.

The display device can determine a distance between the second point and the third point, a path, and the like based on a point of departure. If it is determined as the second point is farther than the third point, the display device can configure the third point as a stopover. If it is determined as the third point is farther than the second point, the display device can configure the second point as a stopover and can configure the third point as a destination. In FIG. 11*a* (c), the third point is farther than the second point.

FIG. 11A (d) illustrates a display device on which a moving path including a stopover is displayed. As mentioned in the foregoing description, the display device can determine as a third point is farther than a second point based on a point of departure. Hence, the display device changes the second point to a stopover and can configure the third point as a destination. In addition, the display device can display a path starting from the point of departure and arriving at the destination via the stopover.

Figure 11B:
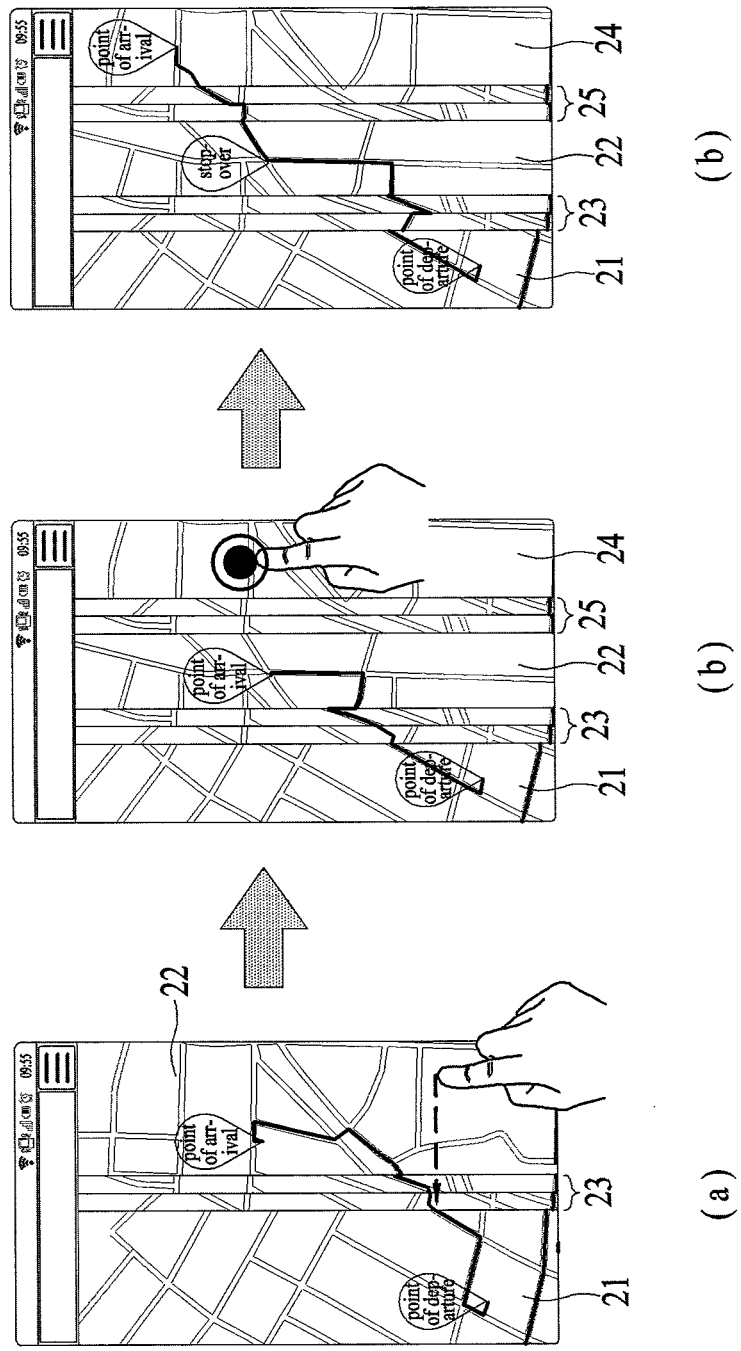
FIG. 11B is a diagram illustrating a method of searching for a moving path according to a different embodiment of the present invention.

FIG. 11B is a diagram illustrating a method of searching for a moving path according to a different embodiment of the present invention. In particular, FIG. 11B (a) illustrates a display device to which a point of departure and a point of arrival are set. The display device can configure a first area 21, a second area 22 and an overlap area 23 by performing the aforementioned various processes. In addition, the display device can configure the point of departure and the point of arrival according to a touch gesture input on the display device. If the point of departure and the point of arrival are set, the display device can calculate a moving path and can display the moving path on the display device.

Further, the display device can automatically change a scale of the first area 21 and a scale of the second area 22. In addition, the display device can change the scale of the first area 21 and the scale of the second area 22, respectively. For instance, the point of departure can be included in the first area 21 and the point of arrival can be included in the second area 22. In addition, the searched moving path can be simply displayed at a point near the point of departure and can be displayed in detail at a point near the point of arrival. The display device can also automatically zoom-out a map of the first area 21 and zoom-in a map of the second area 22. A user can additionally search for a moving path including a third point. Yet, the third point may not be included in the second area 22. The user can input a sweep touch gesture.

FIG. 11B (b) illustrates a display device on which a command for selecting a new point is input. The display device can configure a third area 24 distinguished from a second area 22 in response to an input sweep touch gesture. In addition, the display device can configure a second overlap area 25 between the second area 22 and the third area 24. In particular, the display device can display contents by dividing the contents into three areas. In particular, the first area 21, the second area 22 and the third area 24 can be independently controlled. A user can input a touch gesture equal to or greater than predetermined pressure on a point of the third area 24.

FIG. 11B (c) illustrates a display device on which a moving path including a stopover is displayed. The display device can receive a touch gesture input equal to or greater than predetermined pressure input on a new third point of the third area 24. The display device can configure the third point as a point of arrival. In addition, the display device can change a second point of the second area 22 to a stopover from a point of arrival. The display device can display a path starting from a point of departure and arriving at a destination via a stopover on the display device.

Further, the display device can automatically change a scale of the first area 21, a scale of the second area 22 and a scale of the third area. In addition, the display device can change the scale of the first area 21, the scale of the second area 22 and the scale of the third area, respectively. For instance, a point of departure can be included in the first area 21, a stopover can be included in the second area 22 and a point of arrival can be included in the third area 24. In addition, the searched moving path can be simply displayed at a point near the point of departure, a walking moving path can be additionally displayed at a point near the stopover and the moving path can be displayed in detail at a point near the point of arrival. The display device can automatically zoom-out a map of the first area 21, maximally zoom-in a map of the second area 22 and can slightly zoom-in a map of the third area 24.

Next, FIG. 12 is a diagram illustrating a method of searching for a moving path according to a different embodiment of the present invention. FIG. 12 (*a*) illustrates a display device receiving a selection of a destination. The display device can display a first area 21, a second area 22 and an overlap area 23, and set a point of departure to the first area 21 and set a destination to the second area 22 via the aforementioned process.

FIG. 12 (*b*) illustrates a display device on which a first moving path 31 is displayed. As mentioned in the foregoing description, if a point of departure and a destination are configured, the display device can calculate and display the first moving path 31. Further, the display device can include a sensing unit that can detect a shaking of the display. A user can shake the display device when the first moving path 31 is displayed.

FIG. 12 (*c*) illustrates a display device on which a second moving path 32 is displayed. The display device can detect a shaking of the display device via the sensing unit. When the first moving path 31 is displayed, if a shaking equal to or greater than predetermined strength is detected, the display device can calculate display the second moving path. In some cases, while the display device displays the first moving path 31 by calculating a plurality of moving paths, and if a shaking equal to or greater than the predetermined strength is detected, the display device can display the second moving path 32. If the display device detects a shaking again, the display device can display a third moving path. In addition, while the display device displays the second moving path 32, if the display device detects a shaking again when the third moving path is not displayed, the display device can display the first moving path 31 again.

Figure 13:
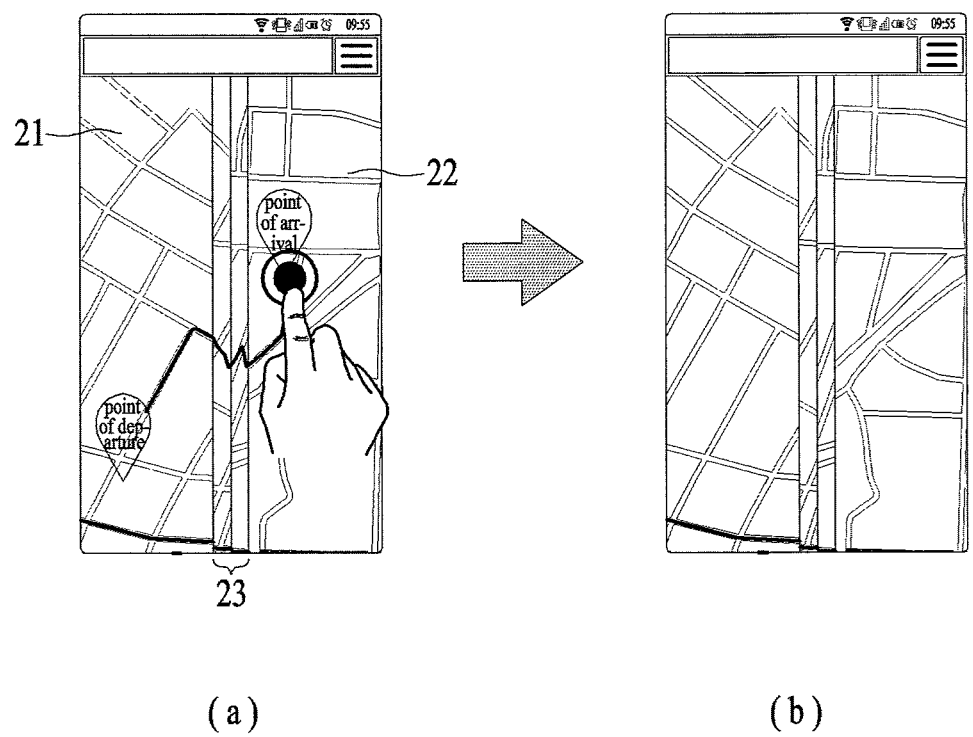
FIG. 13 is a diagram illustrating a method of deleting a moving path according to one embodiment of the present invention.

Next, FIG. 13 is a diagram illustrating a method of deleting a moving path according to one embodiment of the present invention. In particular, FIG. 13 (*a*) illustrates a display device on which a moving path is displayed. The display device can configure a first area 21, a second area 22 and an overlap area 23 via the aforementioned process. In addition, if a touch input equal to or greater than a predetermined pressure input on a first point of the first area 21 is detected, the display device configures the first point as a point of departure. If a touch input equal to or greater than a predetermined pressure input on a second point of the second area 22 is detected, the display device can configure the second point as a destination. If the point of departure and the destination are configured, the display device can calculate a moving path. A user can input a touch gesture pushing and rubbing the moving path with pressure equal to or greater than predetermined pressure.

FIG. 13 (*b*) illustrates a display device from which a moving path is deleted. The display device can detect a touch gesture pushing and rubbing the moving path with pressure equal to or greater than a predetermined pressure. If a touch and rub gesture equal to or greater than the predetermined pressure is input, the display device can delete the displayed moving path. In addition, if a touch gesture pushing and rubbing a point of departure or a destination with pressure equal to or greater than the predetermined pressure is detected, the display device can delete the displayed moving path. In particular, if a sweep touch input equal to or greater than first pressure input on the point of departure or the destination is detected, the display device can delete the displayed moving path.

Figure 14:
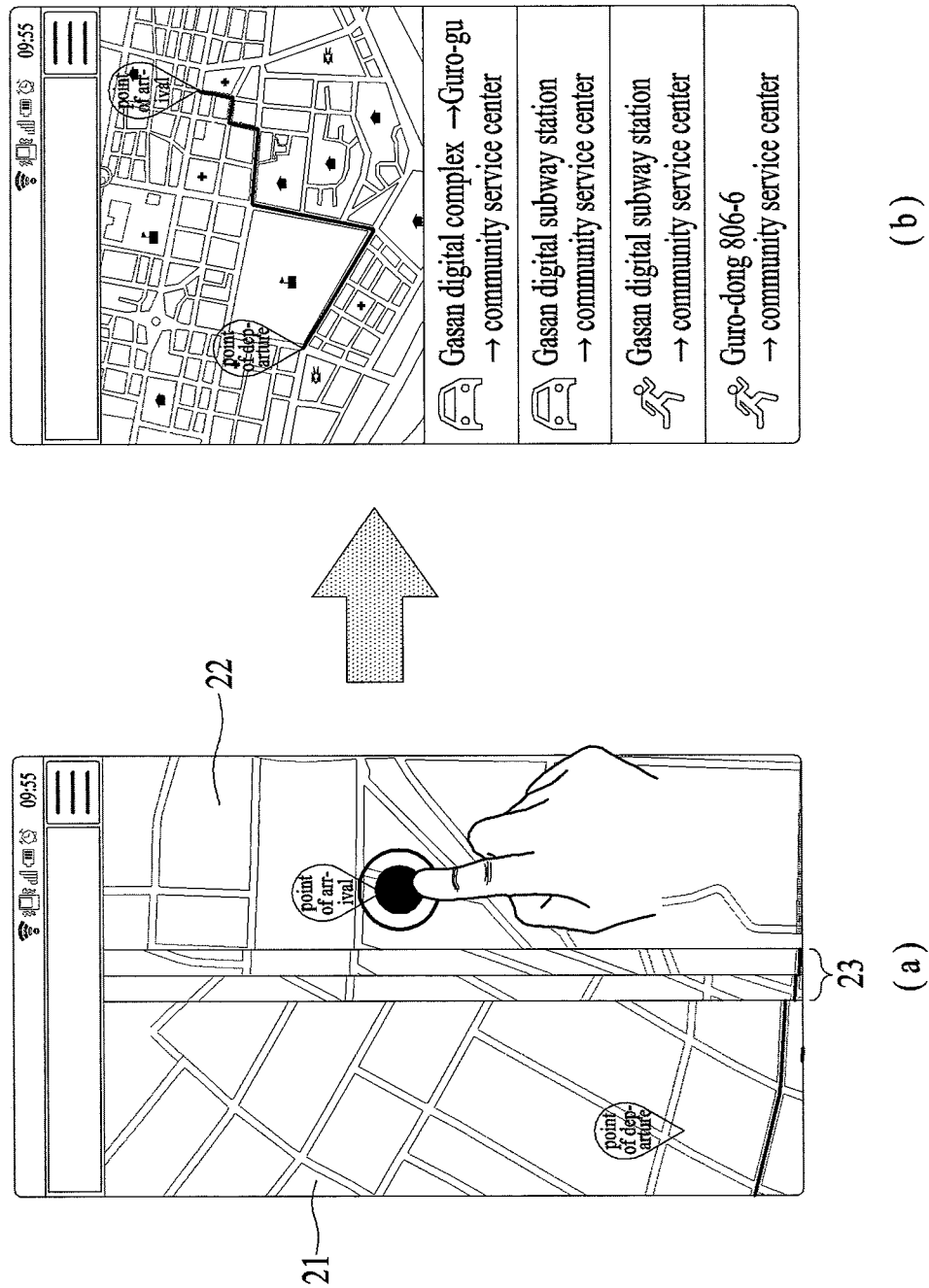
FIG. 14 is a diagram illustrating a method of displaying a moving path according to a different embodiment of the present invention.

Next, FIG. 14 is a diagram illustrating a method of displaying a moving path according to a different embodiment of the present invention. In particular, FIG. 14 (*a*) illustrates a display device on which an input of selecting a destination is received. The display device can display a first area 21, a second area 22 and an overlap area 23. The display device can set a point of departure and a destination to the first area 21 and the second area 22, respectively, via the aforementioned process.

In addition, FIG. 14 (*b*) illustrates a display device on which a moving path is displayed. If a point of departure and a destination are configured, the display device can calculate a moving path and display the moving path on the display. Further, the display device can display not only display the moving path but also display concrete path information on a map. When the calculated moving path is displayed, the display device can display the moving path by unfolding the overlap area. In addition, the display device can automatically change a scale of the map to display the whole of the moving path on a single screen. In order to display the moving path on a single screen and make the whole of the moving path to be displayed in maximum size, the display device can configure an appropriate scale.

Figure 15:
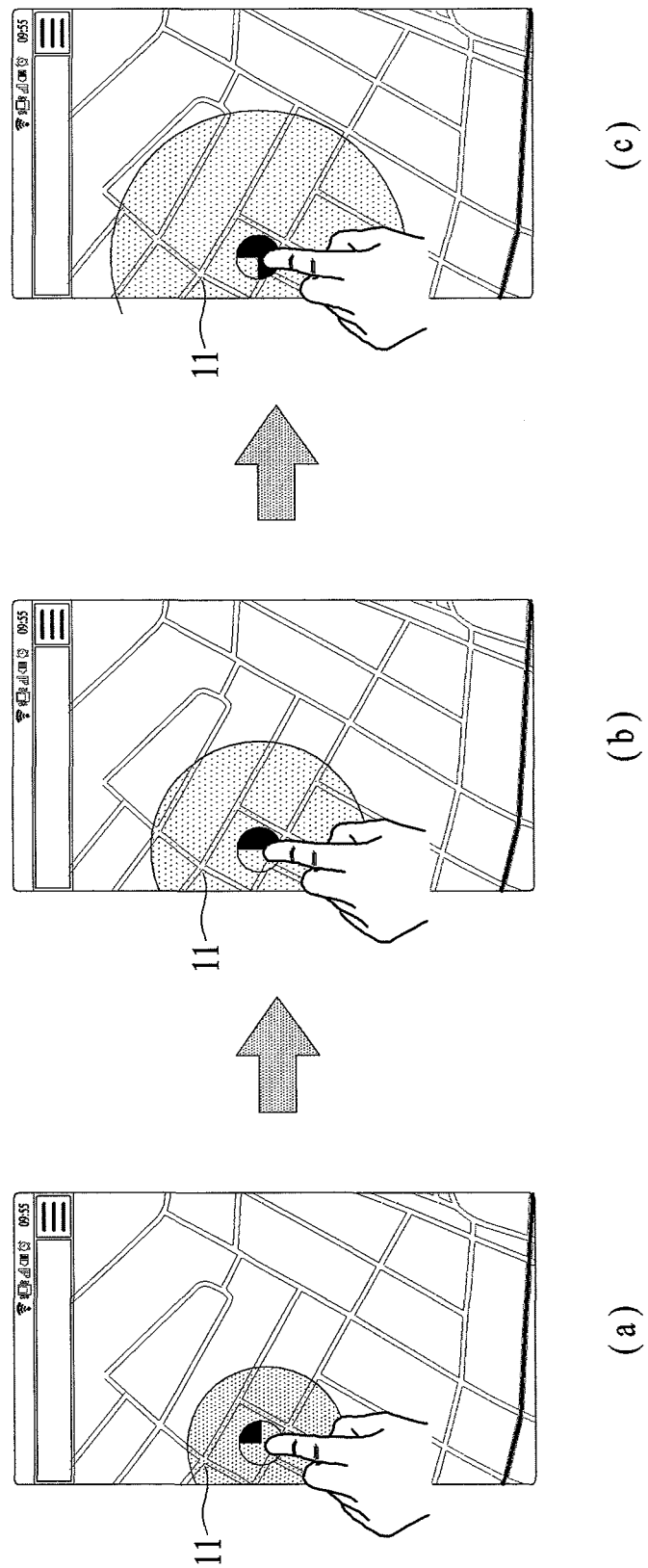
FIG. 15 is a diagram illustrating a method of controlling area of a first temporary area according to one embodiment of the present invention.

FIG. 15 is a diagram illustrating a method of controlling area of a first temporary area according to one embodiment of the present invention. A display device can detect a pressure of a touch gesture. Hence, the display device can perform commands different from each other depending on the detected pressure. FIG. 15 (*a*) illustrates a display device on which a touch gesture of first pressure is input. As mentioned in the foregoing description, if a touch gesture equal to or greater than predetermined pressure is input on a first point, the display device can configure a first temporary area 11 based on the first point.

The display device can configure a first area and a second area based on the first temporary area 11 and a direction of a sweep touch gesture. The predetermined pressure, which is used to configure the first temporary area 11, can be configured as the first pressure. In particular, if a touch gesture equal to or greater than the first pressure is input, the display device can configure the first temporary area 11. The display device can display a strength of a touch pressure for a user. In particular, the display device can display not only the configured first temporary area 11 but also the strength of the touch pressure.

FIG. 15 (*b*) illustrates a display device on which a touch gesture of second pressure is input. The display device can receive a touch gesture input pushed by a pressure equal to or greater than the first pressure. If the display device receives a touch gesture input equal to or greater than the second pressure, the display device can configure a larger first temporary area 11. The second pressure may correspond to a pressure greater than the first pressure. In addition, the display device can configure a first area and a second area based on the first temporary area 11 and a direction of a sweep touch gesture.

FIG. 15 (c) illustrates a display device on which a touch gesture of a third pressure is input. If the display device receives a touch gesture input equal to or greater than the third pressure, the display device can configure a larger first temporary area 11. The third pressure may correspond to a pressure greater than the second pressure. In particular, the display device can control a size of the first temporary area 11 in proportion to a strength of a pressure of a touch input input on a first point. The display device can configure a relation between the pressure of the touch gesture and the size of the first temporary area 11 discretely or contiguously. The display device can also configure a first area and a second area based on the first temporary area 11 and a direction of a sweep touch gesture. As the size of the first temporary area 11 becomes larger, the first area to be configured can become larger.

Figure 16:
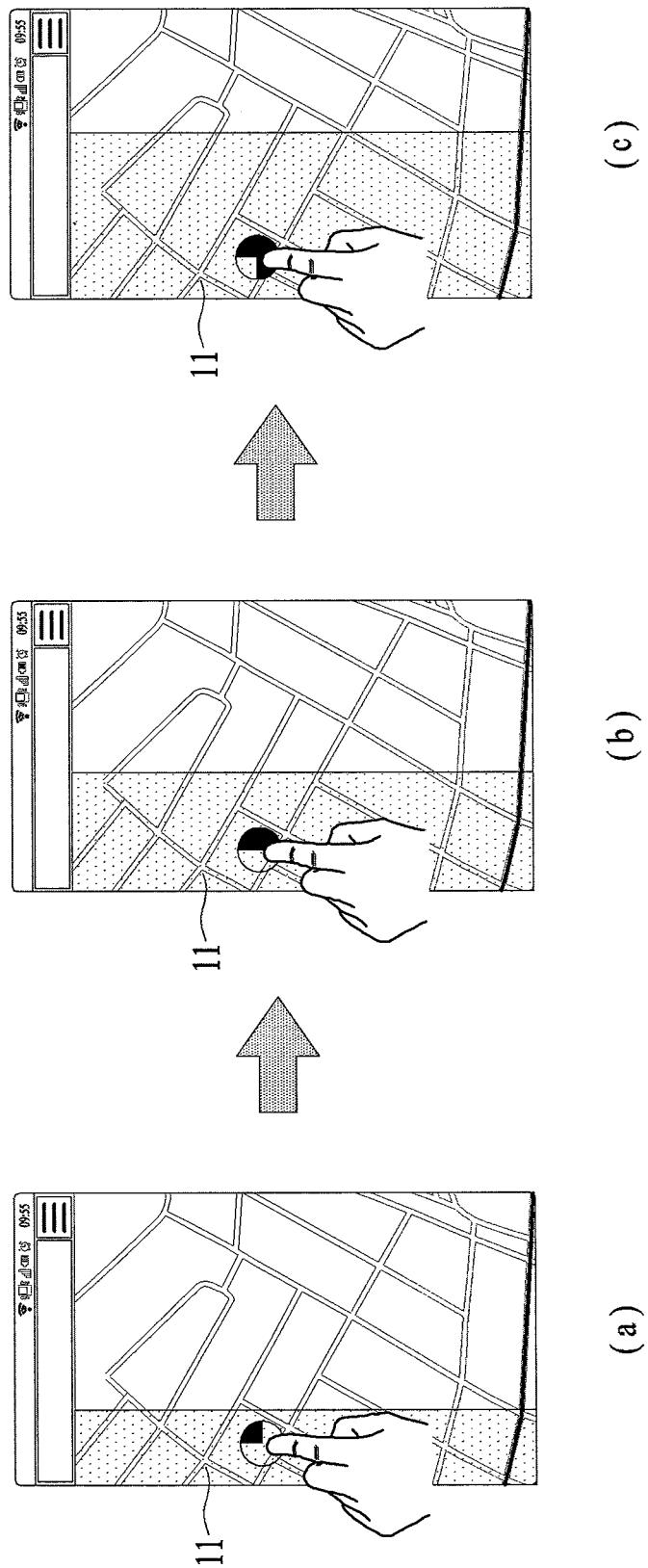
FIG. 16 is a diagram illustrating a method of controlling area of a first temporary area according to a different embodiment of the present invention.

Next, FIG. 16 is a diagram illustrating a method of controlling an area of a first temporary area according to a different embodiment of the present invention. FIG. 16 (a) illustrates a display device receiving a touch gesture input of first pressure. The display device can configure a first temporary area 11 based on a vertical line. However, when configuring the first temporary area 11 based on the vertical line, if the first temporary area 11 is determined, the first temporary area can immediately become a first area. Hence, the first temporary area 11 may be identical to the first area. If a touch gesture equal to or greater than a first pressure is input, the display device can configure the first temporary area 11. If the touch gesture equal to or greater than the first pressure is maintained for more than predetermined time or a touch gesture is input on a second point, the display device can configure a first area and a second area.

In addition, FIG. 16 (b) illustrates a display device receiving a touch gesture input of a second pressure. If a touch gesture equal to or greater than the second pressure is input, the display device can configure a larger first temporary area 11. The second pressure may correspond to a pressure greater than the first pressure. The display device can configure a first area and a second area based on the configured first temporary area 11.

FIG. 16 (c) illustrates a display device receiving a touch gesture input of a third pressure. If a touch gesture equal to or greater than the third pressure is input, the display device can configure a larger first temporary area 11. The third pressure may correspond to pressure greater than the second pressure. In particular, the display device can control a size of the first temporary area 11 in proportion to a strength of pressure of a touch input input on a first point. The display device can configure a relation between the pressure of the touch gesture and the size of the first temporary area 11 discretely or contiguously. As the size of the first temporary area 11 is getting bigger, the first area to be configured can become larger. Although an embodiment of configuring the first area based on the vertical line has explained in FIG. 16, the first area can be configured based on a horizontal line or a diagonal line as well. In addition, the first area can also be configured in various ways according to a user selection.

Further, a size of the first area and a size of the second area can also be controlled by a different scheme.

Figure 17:
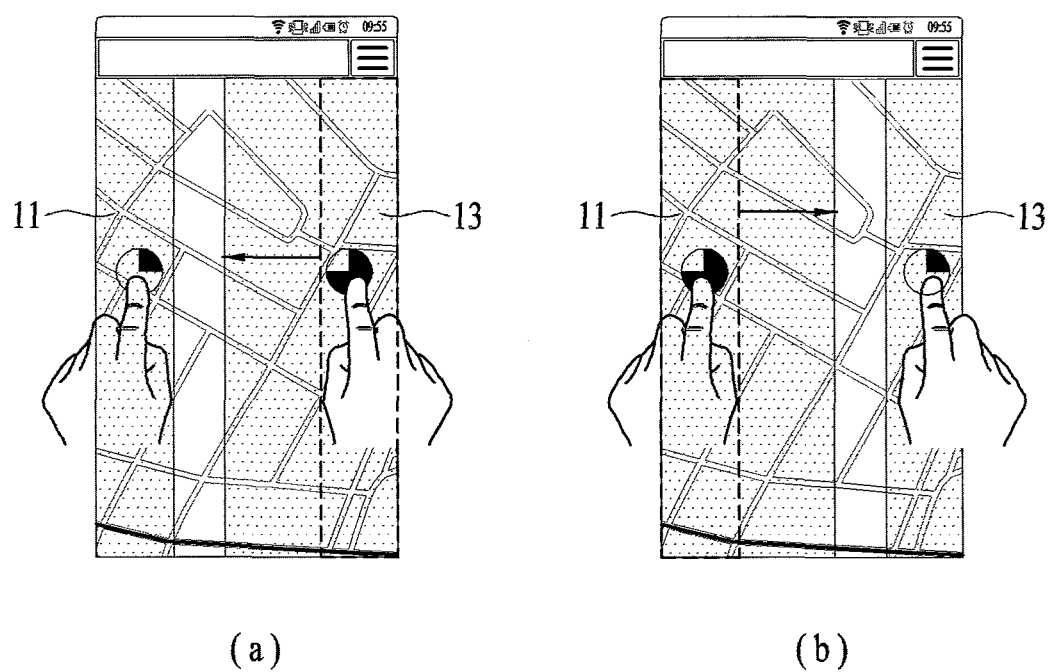
FIG. 17 is a diagram illustrating a method of controlling area of a first area and a second area according to one embodiment of the present invention.

Next, FIG. 17 is a diagram illustrating a method of controlling an area of a first area and a second area according to one embodiment of the present invention. FIG. 17 (a) illustrates a display device of which touch gestures are input on a first point and a second point, respectively. The display device can receive touch gesture inputs of a prescribed pressure on the first point and the second point. Further, the display device can control a size of a first area 11 and a size of a second area 13 according to a pressure of the touch gestures input on the first point and the second point. In particular, if the pressure of the touch gesture input on the first point and the pressure of the touch gesture input on the second point are identical to each other, the display device can configure the area of the first area 11 to be identical to the area of the second area 13.

If the pressure of the touch gesture input on the second point is greater than the pressure of the touch gesture input on the first point, the display device can configure the area of the second area 13 to be greater than the area of the first area. Thus, the display device can control the area of the first area 11 and the area of the second area 13 in proportion to the pressure of the touch gesture input on the first point and the pressure of the touch gesture input on the second point. Further, the display device can display a size of a first temporary area and a size of a second temporary area according to a pressure of a touch gesture. In addition, the display device can display a strength of a pressure of a touch gesture.

FIG. 17 (b) illustrates a pressure of a touch gesture input on a first point being greater than a pressure of a touch gesture input on a second point. As mentioned in the foregoing description, the display device can configure the first area 11 and the second area 13 in proportion to the strength of pressure of the touch gesture input on the first point and the strength of pressure of the touch gesture input on the second point. If the strength of the pressure of the touch gesture input on the first point increases, the display device can configure the area of the first area 11 to be greater. The display device can configure a relation between strength of pressure of a touch gesture and the area of an area discretely or contiguously.

Figure 18:
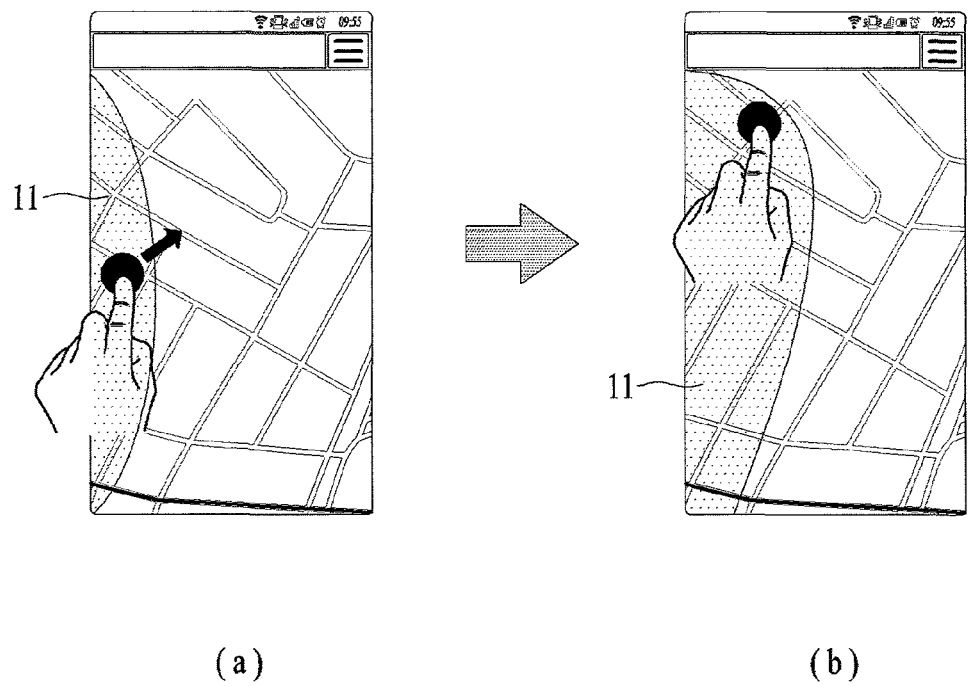
FIG. 18 is a diagram illustrating a method of controlling area of a first temporary area according to a further different embodiment of the present invention.

FIG. 18 is a diagram illustrating a method of controlling area of a first temporary area according to a further different embodiment of the present invention. FIG. 18 (a) illustrates a display device of which a touch gesture is input on a first point. A user can input a touch gesture equal to or greater than predetermined pressure on the first point. If the touch gesture equal to or greater than the predetermined pressure is detected, the display device can configure a first temporary area 11. It may display the first temporary area 11.

FIG. 18 (b) illustrates a display device receiving a sweep touch gesture. A user can move a touch gesture to a different point while maintaining the touch. In particular, the user can input a sweep touch gesture. If the sweep touch gesture is detected, the display device can move a first temporary area 11 based on the sweep touch gesture. As an embodiment, the sweep touch gesture can be input while a pressure equal to or greater than a predetermined pressure is maintained. In addition, the sweep touch gesture is input on a first point with a pressure equal to or greater than the predetermined pressure and can be swept with a pressure less than the predetermined pressure. The display device can configure the first temporary area 11 as a first area. In addition, the display device can configure the first area based on the first temporary area 11 and a direction of a sweep touch gesture moving to the first temporary area 11 from a second point.

Figure 19:
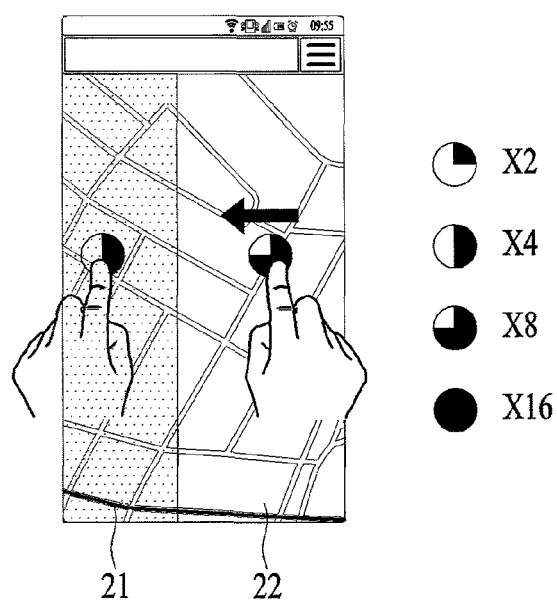
FIG. 19 is a diagram illustrating a method of controlling moving speed of a second area according to one embodiment of the present invention.

FIG. 19 is a diagram illustrating a method of controlling a moving speed of a second area according to one embodiment of the present invention. A display device can configure a first area 21 and a second area 22 using the aforementioned method. The display device can move (or scroll) contents of the second area according to a sweep touch gesture input on the second area 22. In this instance, the display device can control the moving speed of the contents in proportion to the pressure of the sweep touch gesture.

For instance, if the display device receives an input of the sweep touch gesture with a strength equal to or greater than a first pressure and the strength less than a second pressure, the display device can move the contents with a speed as fast as two times. If the display device receives an input of the sweep touch gesture with a strength equal to or greater than the second pressure and the strength less than third pressure, the display device can move the contents with a speed as fast as four times. If the display device receives an input of the sweep touch gesture with a strength equal to or greater than the third pressure and the strength less than fourth pressure, the display device can move the contents with a speed as fast as eight times.

If the display device receives an input of the sweep touch gesture with a strength equal to or greater than the fourth pressure, the display device can move the contents with a speed as fast as sixteen times. In particular, the display device can control a moving speed of the second area in proportion to a strength of pressure of a sweep touch gesture input on the second point. For user convenience, the display device can display the strength of a pressure of the sweep touch gesture. Further, the display device can perform various functions on a general content screen using a touch gesture including pressure.

Figure 20:
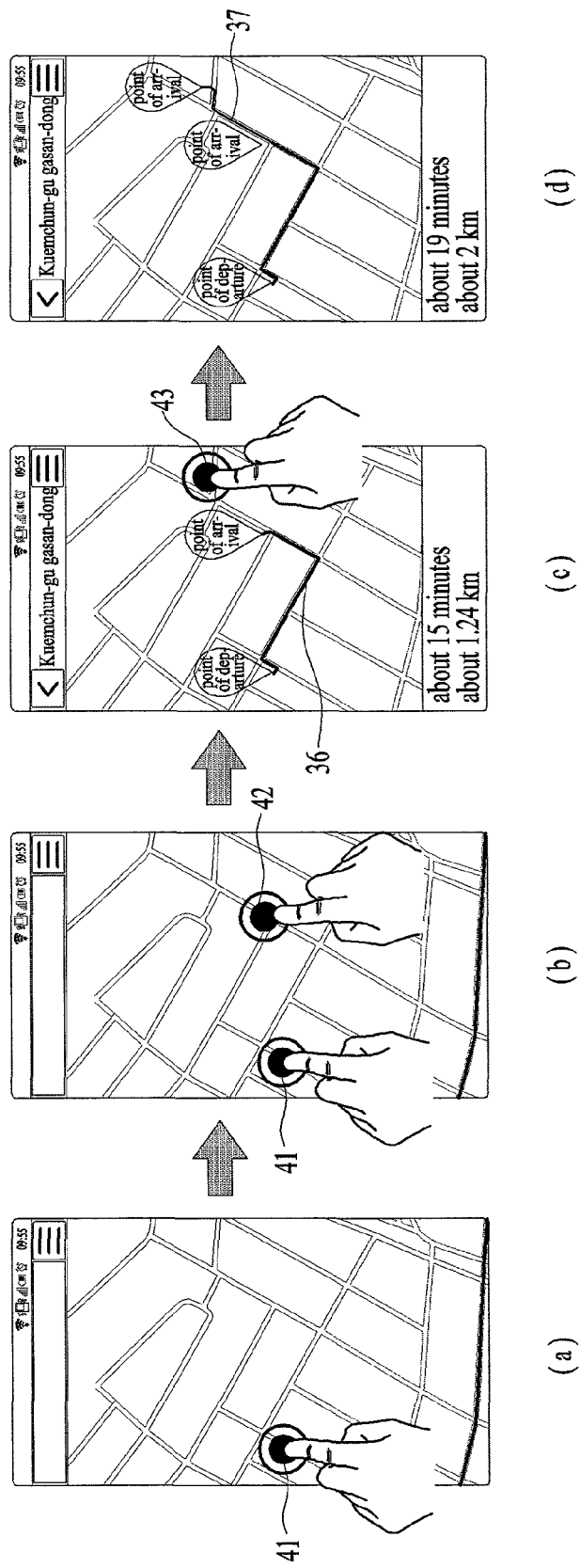
FIG. 20 is a diagram illustrating a method of configuring a moving path by detecting pressure according to one embodiment of the present invention.

FIG. 20 is a diagram illustrating a method of configuring a moving path by detecting a pressure according to one embodiment of the present invention. FIG. 20 (*a*) illustrates a display device receiving a touch gesture equal to or greater than a predetermined pressure input on a first point. The display device can display a general map image without configuring a separate area. The display device can display a moving path on the general map image by receiving an input of a touch gesture including pressure. If a touch gesture equal to or greater than predetermined pressure input on a first point 41 is detected, the display device can configure the first point 41 on which the touch gesture is input as a point of departure.

FIG. 20 (*b*) illustrates a display device receiving a touch gesture equal to or greater than a predetermined pressure input on a second point. If a touch gesture equal to or greater than a predetermined pressure input on a second point 42 is detected, a user can configure the second point 42 on which the touch gesture is input as a destination.

FIG. 20 (*c*) illustrates a display device on which a moving path is displayed. If a point of departure and a destination are configured, the display device can calculate a first moving path 36 and can display the first moving path on the display device. A user can input a touch gesture equal to or greater than predetermined pressure on a third point 43.

FIG. 20 (*d*) illustrates a display device on which a second moving path 37 is displayed. If a touch gesture equal to or greater than a predetermined pressure input on a third point 43 is detected on a screen on which a first moving path 36 is displayed, the display device can calculate a new moving path. The display device can configure the third point 43 as a destination or a stopover. The display device can determine a distance between the second point 42 and the third point 43, a path and the like based on a point of departure. If it is determined as the second point 42 is farther than the third point, the display device can configure the third point 43 as a stopover. If it is determined as the third point 43 is farther than the second point, the display device changes the second point 42 to a stopover and can configure the third point 43 as a destination. In FIG. 20 (*d*), since the third point 43 is farther than the second point 42, the display device changes the second point to a stopover and can configure the third point 43 as a destination. In addition, the display device can display a second moving path 37 starting from the point of departure and arriving at the destination via the stopover.

Figure 21:
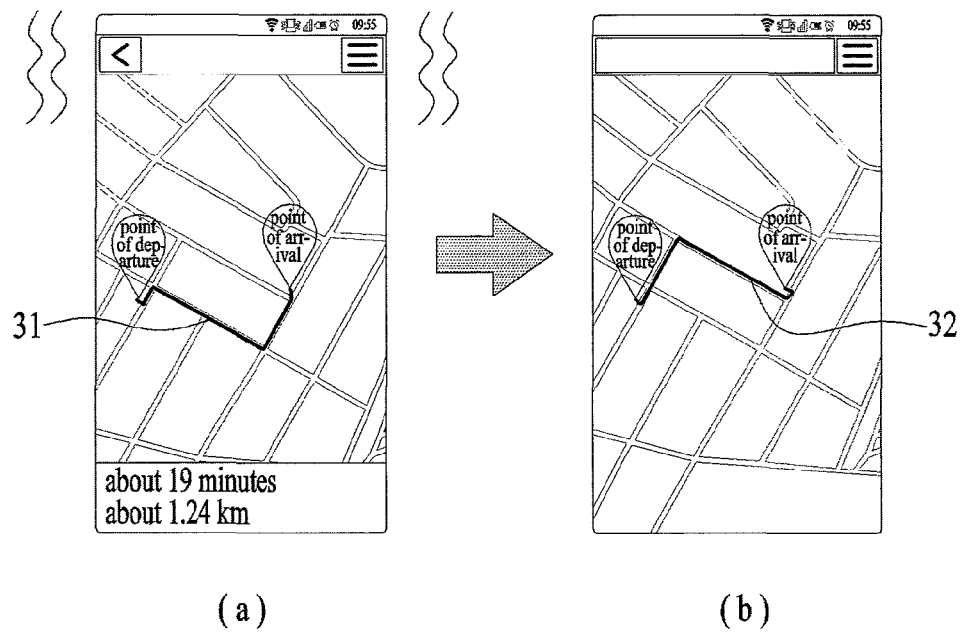
FIG. 21 is a diagram illustrating a method of changing a moving path according to one embodiment of the present invention.

FIG. 21 is a diagram illustrating a method of changing a moving path according to one embodiment of the present invention. FIG. 21 (*a*) illustrates a display device on which a first moving path 31 is displayed. As mentioned in the foregoing description, the display device can configure a point of departure and a destination based on a touch gesture equal to or greater than a predetermined pressure. If the point of departure and the destination are configured, the display device can calculate a moving path. Further, the display device can detect a shaking of the display device by including a sensing unit. A user can shake the display device on which the first moving path 31 is displayed.

FIG. 21 (*b*) illustrates a display device on which a second moving path 32 is displayed. The display device can detect a shaking of the display device via a sensing unit. When the first moving path 31 is displayed on the display device, if a shaking equal to or greater than a predetermined strength is detected, the display device can calculate a second moving path 32 and can display the second moving path on the display device. In some cases, while the display device displays the first moving path 31 by calculating a plurality of moving paths, if a shaking equal to or greater than the predetermined strength is detected, the display device can display the second moving path 32 on the display device. If shaking of the display device is detected again, the display device can display a third moving path on the display. In addition, while the display device displays the second moving path 32 and the third moving path is not displayed, if a shaking of the display device is detected again, the display device can display the first moving path 31 again.

Figure 22:
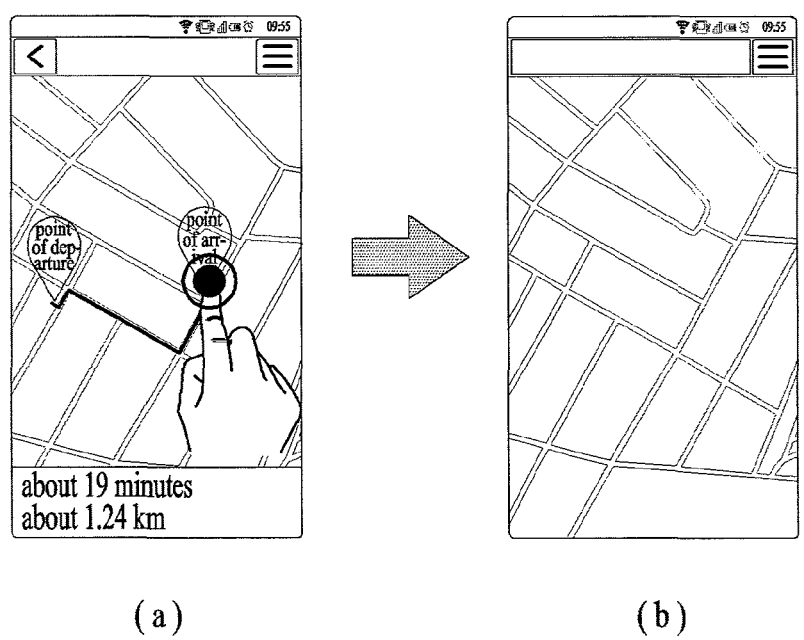
FIG. 22 is a diagram illustrating a method of deleting a moving path according to one embodiment of the present invention.

FIG. 22 is a diagram illustrating a method of deleting a moving path according to one embodiment of the present invention. FIG. 22 (*a*) illustrates a display device on which a moving path is displayed. The display device can configure a point of departure and a destination based on a touch gesture equal to or greater than predetermined pressure. If the point of departure and the destination are configured, the display device can calculate a moving path and can display the moving path on the display device. A user can input a touch gesture pushing and rubbing the moving path with pressure equal to or greater than the predetermined pressure.

FIG. 22 (*b*) illustrates a display device from which a moving path is deleted. The display device can detect a touch gesture pushing and rubbing a moving path with a pressure equal to or greater than predetermined pressure. If a touch and rib gesture equal to or greater than the predetermined pressure is input, the display device can delete the displayed moving path from the display device. In addition, if a touch gesture pushing and rubbing a point of departure or a destination with pressure equal to or greater than the predetermined pressure is detected, the display device can delete the displayed moving path.

Figure 23:
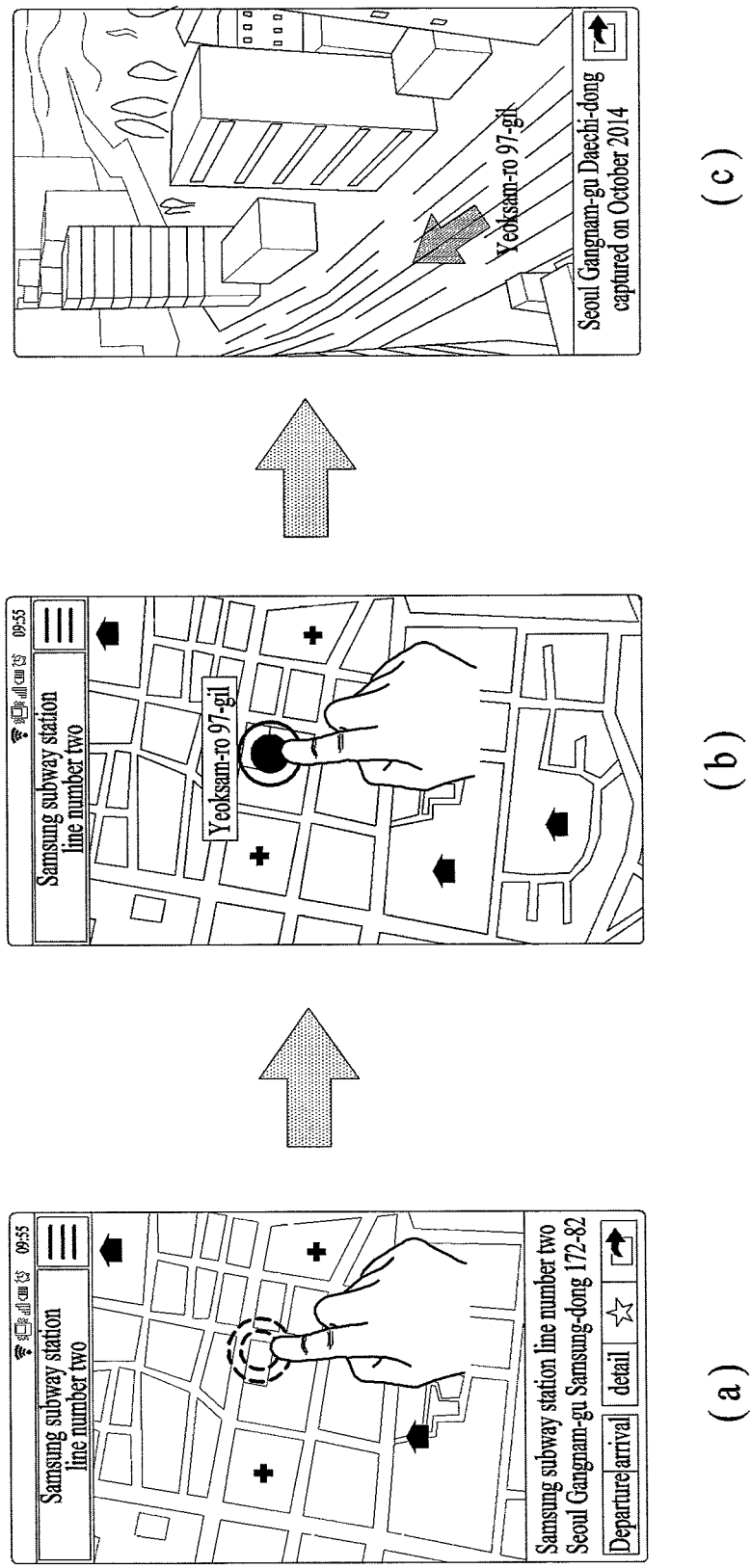
FIG. 23 is a diagram illustrating a method of selecting a display method by detecting pressure according to one embodiment of the present invention.

FIG. 23 is a diagram illustrating a method of selecting a display method by detecting a pressure according to one embodiment of the present invention. FIG. 23 (a) illustrates a display device receiving an input of a touch gesture equal to or less than first pressure. The display device can perform various functions based on a strength of a touch gesture. As an embodiment, the display device can display map contents. The display device can receive a touch gesture input equal to or less than first pressure on a map image. If the display device detects the touch gesture equal to or less than the first pressure, the display device can display information on a selected point. For instance, the information on the selected point can include a name, an address, a telephone number, additional information and the like.

FIG. 23 (b) illustrates a display device receiving an input of a touch gesture equal to or greater than first pressure. The display device can receive a touch gesture input equal to or greater than the first pressure on a map image. If the display device detects the touch gesture equal to or greater than the first pressure, the display device can display a road view for a selected point. FIG. 23 (c) illustrates a display device on which a road view is displayed. If a touch gesture equal to or greater than a first pressure is detected, the display device can switch to a road view image for a selected point. Hence, a user can conveniently display map contents.

Figure 24:
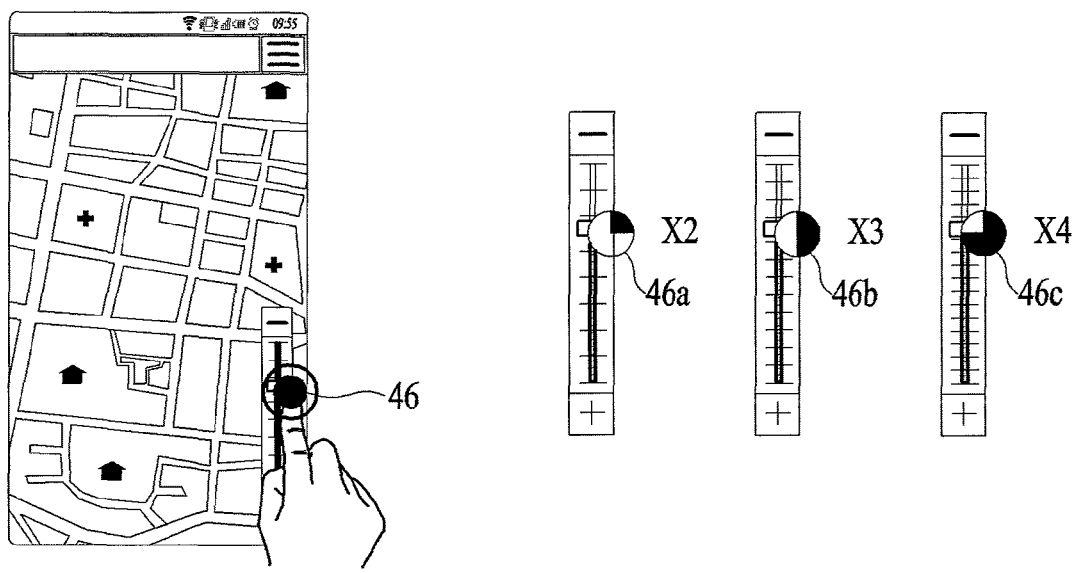
FIG. 24 is a diagram illustrating a method of controlling magnification by detecting pressure according to one embodiment of the present invention.

FIG. 24 is a diagram illustrating a method of controlling magnification by detecting a pressure according to one embodiment of the present invention. FIG. 24 illustrates a display device on which a magnification control bar is displayed. Map contents can include a magnification control bar capable of controlling a magnification of a map. The display device can control a magnification of a map, which is displayed according to a command input via the magnification control bar. In general, a terminal includes a single magnification control bar and the magnification control bar can control magnification of a map according to a predetermined ratio.

However, according to an embodiment of the present invention, a magnification of a map can be controlled in various magnifications using a touch gesture including pressure. A user touches the magnification control bar and can control a magnification of a map. The display device can detect a touch gesture 46 of a user and a strength of pressure of the touch gesture 46. In addition, the display device can variously control a magnification of the magnification control bar according to the strength of pressure of the detected touch gesture.

For instance, if the display device detects a touch gesture 46a equal to or less than a first pressure, the display device can configure the magnification of the magnification control bar to magnification be as much as doubled. Hence, the display device can zoom out or zoom in a map as much as two times. If the display device detects a touch gesture 46b equal to or greater than the first pressure and less than a second pressure, the magnification of the magnification control bar can be configured to be magnification as much as three times. Hence, the display device can zoom out or zoom in a map as much as three times. If the display device detects a touch gesture 46c equal to or greater than a second pressure, the magnification of the magnification control bar can be configured to be magnification as much as four times. Hence, the display device can zoom out or zoom in a map as much as four times.

Figure 25:
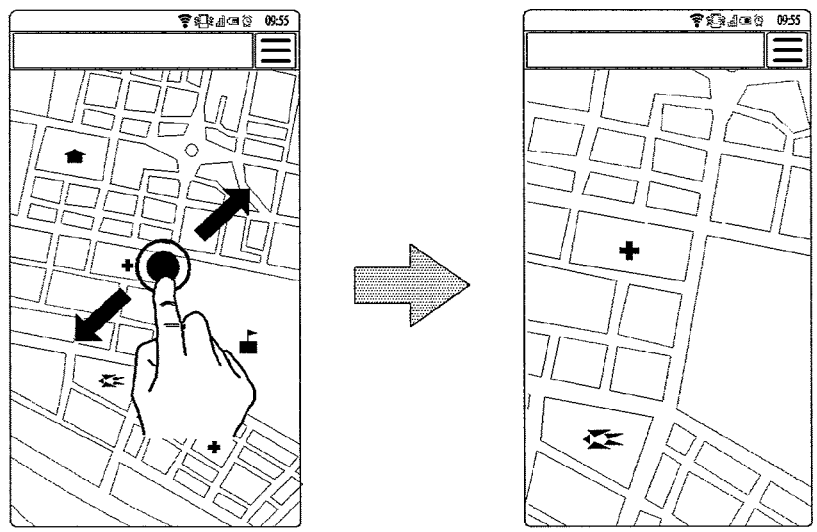
FIG. 25 is a diagram illustrating a method of controlling magnification by detecting pressure according to a different embodiment of the present invention.

FIG. 25 is a diagram illustrating a method of controlling magnification by detecting pressure according to a different embodiment of the present invention. FIG. 25 (a) illustrates a display device receiving an input of a touch gesture equal to or greater than a predetermined pressure. If the touch gesture equal to or greater than the predetermined pressure is input, the display device can enlarge a screen in proportion to the input pressure. For instance, the display device can display map contents. A user can input a touch gesture equal to or greater than a predetermined pressure on a first point of a map image.

FIG. 25 (b) illustrates a display device on which an enlarged map is displayed. If a touch gesture equal to or greater than a predetermined pressure input on a first point is detected, the display device can enlarge a map with a predetermined magnification based on the first point. For instance, the display device can enlarge the map by a magnification as much as two times while the touch gesture is detected. In some cases, the display device can detect a pressure of several levels. In this instance, the display device can control enlarging magnification according to a level of the pressure.

Figure 26:
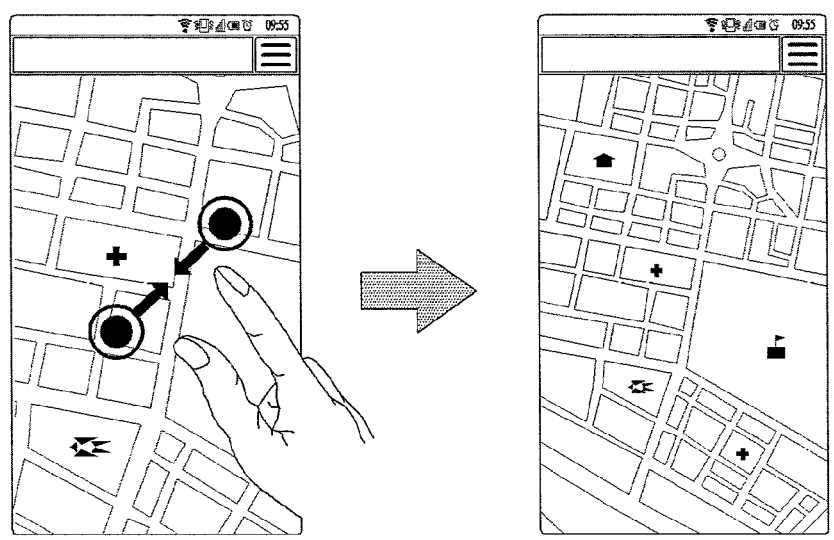
FIG. 26 is a diagram illustrating a method of controlling magnification by detecting pressure according to a further different embodiment of the present invention.

FIG. 26 is a diagram illustrating a method of controlling a magnification by detecting a pressure according to a further different embodiment of the present invention. FIG. 26 (a) shows a display device receiving an input of a pinch-in gesture. As mentioned in the foregoing description, the display device can enlarge a map in proportion to touch pressure. In addition, the display device can reduce a map in response to a pinch-in gesture. In this instance, the display device can detect a pressure of the pinch-in touch and determine a reducing magnification in proportion to the detected pressure of the pinch-in touch.

FIG. 26 (b) illustrates a display device on which a reduced map is displayed. If a pinch-in touch gesture equal to or greater than a predetermined pressure is detected, the display device can reduce a map with a predetermined magnification. In some cases, the display device detects a pressure of several levels and can control a reducing magnification according to a level of pressure. When the display device reduces or enlarges a map by detecting pressure, the display device can display strength of the detected pressure for convenience of a user.

So far, various embodiments are explained based on map contents. In the following, embodiments usable for different contents are explained. In particular, FIG. 27 is a diagram illustrating a method of displaying images on a single screen according to one embodiment of the present invention.

Figure 27:
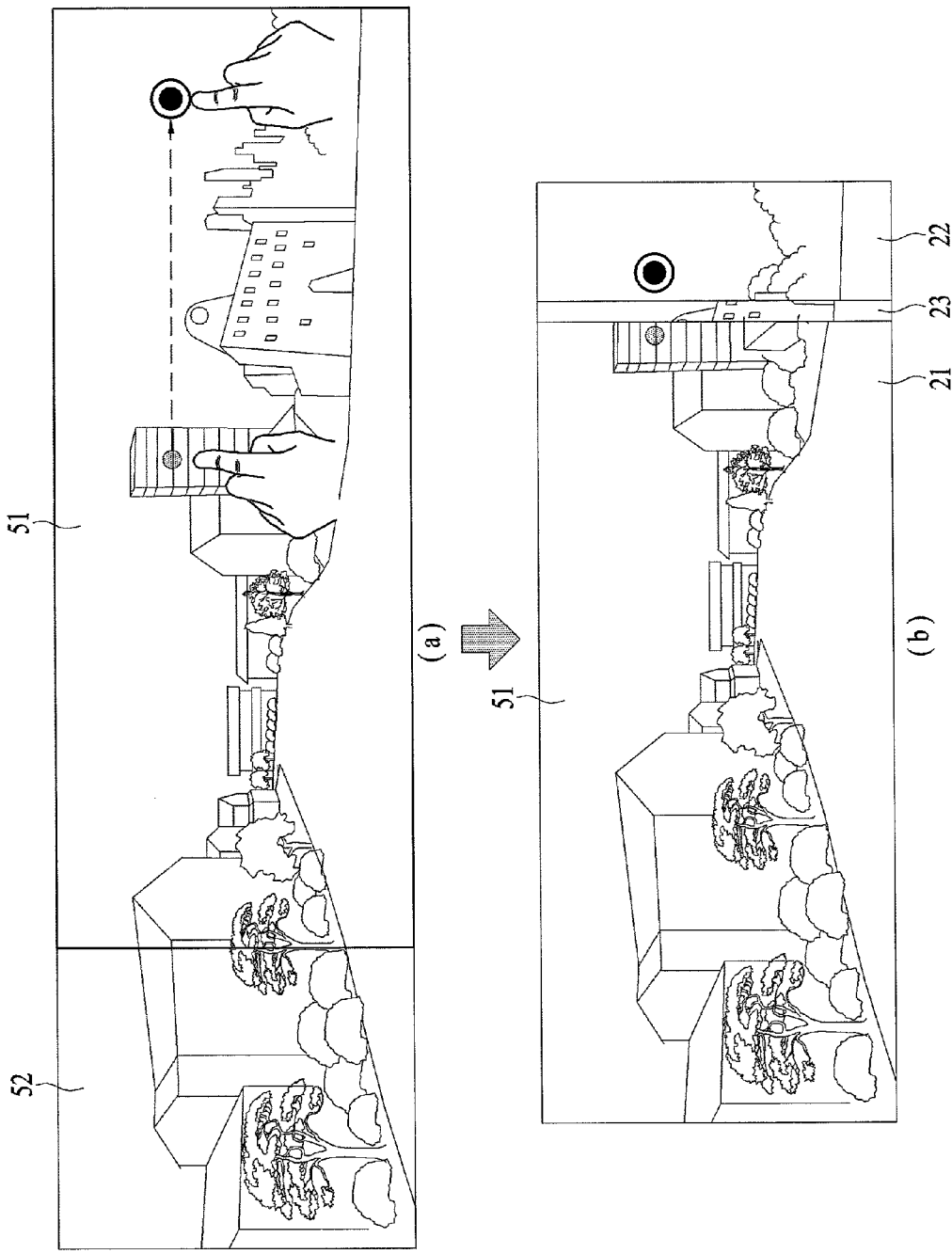
FIG. 27 is a diagram illustrating a method of displaying images on a single screen according to one embodiment of the present invention.

FIG. 27 (a) illustrates a panorama image. In general, a panorama image may not be displayed on a single screen. For instance, a panorama image can include an area 51 displayed on a screen and an area 52 not displayed on the screen. A user may intend to compare two points far from each other in the panorama image with each other or see the two points at the same time. Although the user can reduce the panorama image to make the two points to be displayed on the single screen, objects in the panorama image become smaller and it is difficult for the user to distinguish the objects from each other. The user inputs a touch gesture equal to or greater than a predetermined pressure on a first point and can input a sweep touch gesture heading to the first point on a second point.

FIG. 27 (b) illustrates a panorama image on which an overlap area is generated. If a touch gesture equal to or greater than a predetermined pressure input on a first point is detected, a display device configures a first temporary area. If a sweep touch gesture heading to the first point is detected, the display device configures a first area 21 and a second area 22 and can move the second area 22 to a direction of the first area 21 in response to the sweep touch gesture. An overlap area 23 of the second area can be generated according to the movement of the second area 22.

In addition, the two points far from each other on the panorama image can be displayed on a single screen by being adjacent to each other.

In addition, the display device can configure a boundary line distinguishing the first area 21 from the second area 22 with a vertical line, a horizontal line or a diagonal line in advance. In this instance, if a touch gesture equal to or greater than a predetermined pressure input on the first point is detected, the display device can configure the first area 21 and the second area 22 based on the configured boundary line.

Figure 28:
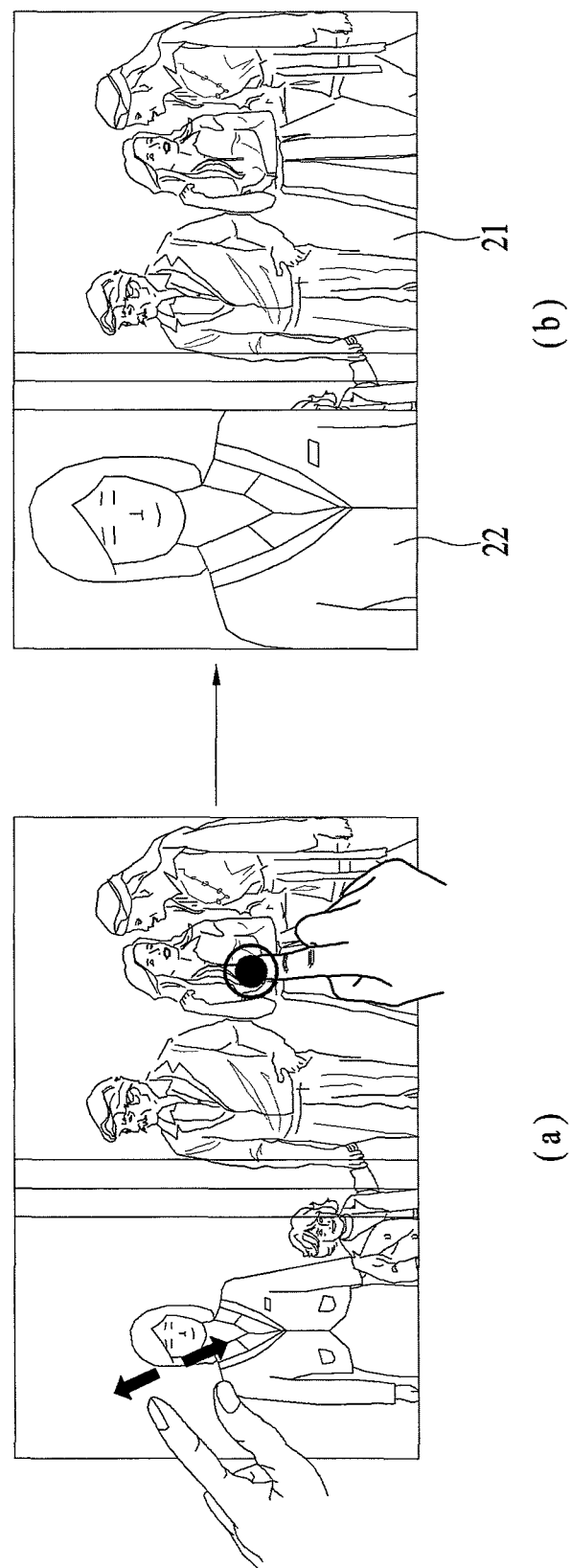
FIG. 28 is a diagram illustrating an image of which two areas are separately controlled according to one embodiment of the present invention.

FIG. 28 is a diagram illustrating an image of which two areas are separately controlled according to one embodiment of the present invention. FIG. 28 (*a*) illustrates an image on which a touch gesture is input. A display device can configure a first area 21 and a second area 22 according to the aforementioned scheme. Further, if the first area 21 and the second area 22 are configured, the display device can individually control each area. For instance, the display device can receive an input of a touch gesture equal to or greater than predetermined pressure on the first area 21 and receive an input of a pinch-out gesture on the second area 22.

FIG. 28 (*b*) illustrates an image that a second area 22 is enlarged. If a first area 21 and a second area 22 are configured, a display device can individually control each area. Hence, the display device holds the first area 21 and can display the second area 22 by zoom-in the second area 22. The display device may not display a boundary line between the first area 21 and the second area 22. However, since the display device individually controls each area, the boundary line for distinguishing two areas from each other can be naturally displayed.

So far, embodiments for an overlap area in a crease form has been explained. In the following, an embodiment for an overlap area in a curved form is explained. In particular, FIG. 29 is a diagram illustrating a method of displaying an overlapped area according to a different embodiment of the present invention.

Figure 29:
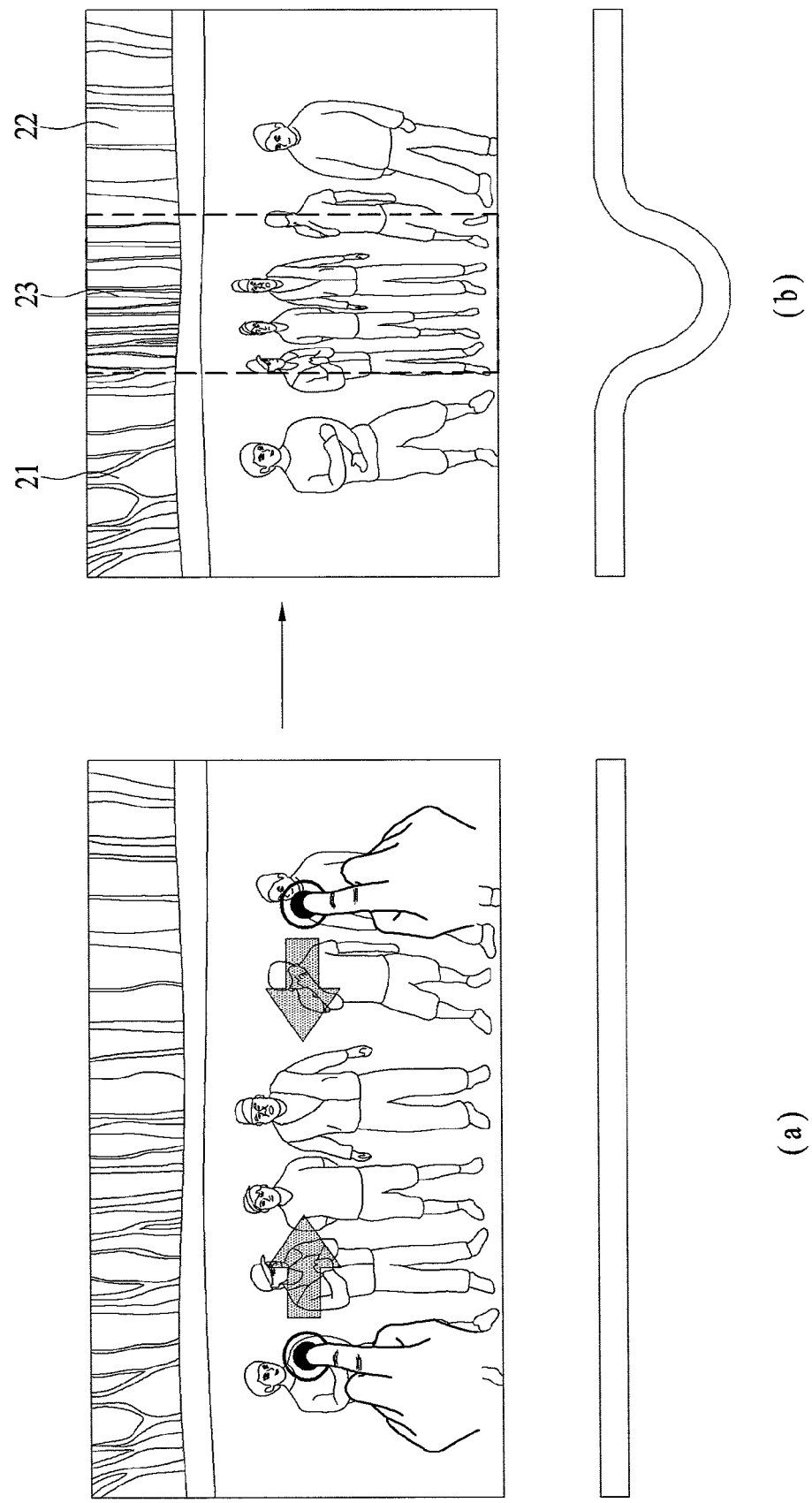
FIG. 29 is a diagram illustrating a method of displaying an overlapped area according to a different embodiment of the present invention.

FIG. 29 (*a*) illustrates a display device displaying an image. Since the image shown in FIG. 29 (*a*) corresponds to a general image, a user can recognize the image as a plane surface. A user can then input a sweep touch gesture equal to or greater than predetermined pressure on two points. FIG. 29 (*b*) illustrates a display device displaying a reduced image. If a sweep touch gesture equal to or greater than a predetermined pressure is detected, the display device can display an image by reducing the image in response to the detected sweep touch gesture. The reduced image can include a first area 21 including a touched first point 21, a second area 22 including a touched second point 22 and a reduced and distorted overlap area 23. The first area 21 and the second area 22 can maintain an original image. The overlap area 23 can be displayed in a manner that the image is reduced by a prescribed ratio.

Among the overlap area 23, boundary parts contacted with the first area 21 and the second area 22 are relatively more reduced and a center part of the overlap area 23 may be relatively less reduced. In particular, the display device reduces images of an overlapped area and can display the images in the predetermined overlap area 23. Hence, a user can recognize the overlap area 23 as a curved area. Since a scheme of reducing an image with a prescribed ratio according to a position of the image in the overlap area 23 makes a user recognize the image as a curved image, the scheme can also be called a curved scheme or a curved display.

Figure 30:
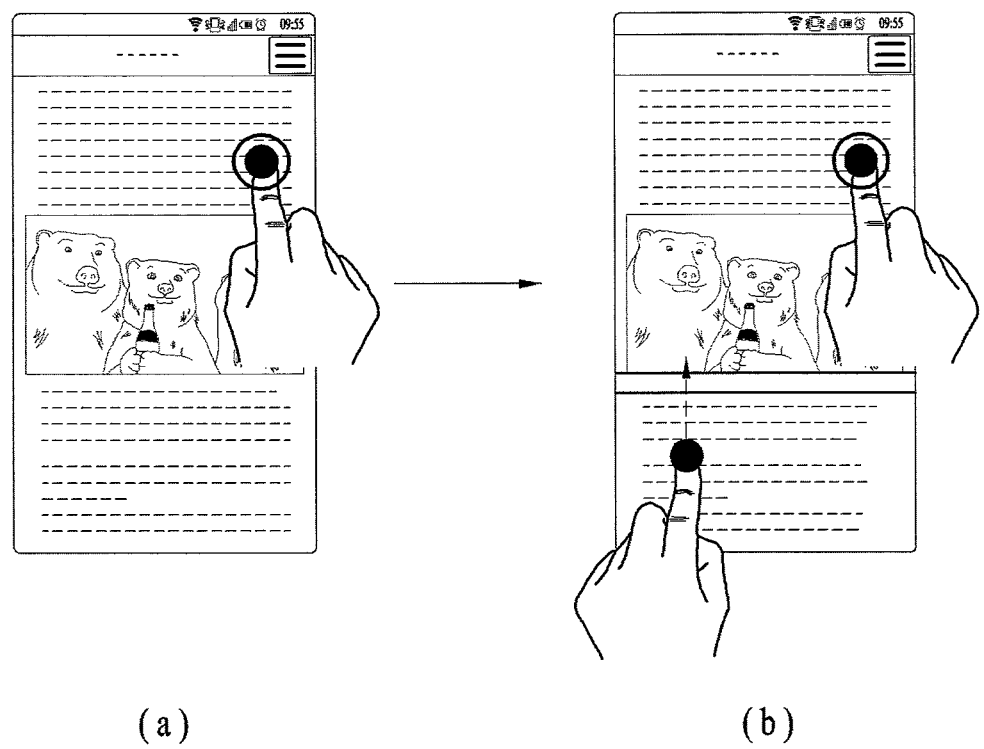
FIG. 30 is a diagram illustrating a method of displaying a specific area of contents on a single screen according to a different embodiment of the present invention.

FIG. 30 is a diagram illustrating a method of displaying a specific area of contents on a single screen according to a different embodiment of the present invention. In particular, FIG. 30 (*a*) illustrates a display device displaying text contents. A user can input a touch gesture equal to or greater than a first pressure on a screen on which the text contents are displayed. As mentioned in the foregoing description, if the touch gesture equal to or greater than the first pressure is detected, the display device can configure a first temporary area or a first area.

FIG. 30 (*b*) illustrates a display device generating an overlap area. If a sweep touch gesture heading to a direction of a first area from a second area is detected, the display device can move contents of the second area based on the sweep touch gesture. Hence, the display device can display two points far from each other on a single screen.

FIG. 31 is a diagram illustrating a method of moving an item according to one embodiment of the present invention. FIG. 31 (*a*) illustrates a display device displaying a music list. As mentioned in the foregoing description, the display device can configure a first area 21, a second area 22 and an overlap area 23 according to a touch gesture equal to or greater than a predetermined first pressure input on a first point and a sweep touch gesture heading to a direction of the first point input on a second point.

FIG. 31 (*b*) illustrates a display device moving a music item. The display device can display a music item located at the bottom of a screen by moving the second area 22 to a direction of the first area 21 according to a sweep touch gesture. The display device can receive an input of a command for selecting a displayed music item 15. The display device can move the selected music item according to a command for moving the selected music item 15. The display device can move the selected music item located at the second area 22 to the first area 21 by crossing over the overlap area 23.

FIG. 31 (*c*) illustrates a display device on which a music item is displayed by moving the music item. The display device moves the music item 15, which is selected according to a user command, and can make the music item to be situated at the inside of the first area 21. In addition, as mentioned in the foregoing description, the display device can unfold an overlap area 23 according to a user command. Hence, the display device can easily move an item not displayed on a single screen.

FIG. 32 is a diagram illustrating a method of displaying a bookmark area according to one embodiment of the present invention. FIG. 32 (*a*) illustrates a display device displaying text contents. The display device can configure a first area, a second area and an overlap area according to a touch gesture equal to or greater than a predetermined first pressure input on a first point and a sweep touch gesture heading to a direction of the first point input on a second point. Further, the display device can display a bookmark on a specific page or a specific area.

FIG. 32 (*b*) illustrates a display device on which a bookmark is displayed. The display device can configure an area on which the bookmark is displayed as an overlap area according to a sweep touch gesture. The display device can generate the number of overlap areas in proportion to the count of sweep touch gestures. The display device can display all bookmarks displayed on the overlap area. A user can select a bookmark.

FIG. 32 (*c*) illustrates a display device displaying a bookmark area. If a bookmark 17 is selected, the display device can display an area on which the selected bookmark 17 is displayed by expanding the area. If a different bookmark is selected, the display device closes the displayed bookmark area 24 and can display an area on which the newly selected bookmark is displayed by expanding the area on which the newly selected bookmark is displayed.

So far, various embodiments of controlling a screen according to a touch gesture have been explained. In the following, a method of controlling a display device is explained. FIG. 33 is a flowchart for a method of controlling a display device according to one embodiment of the present invention.

If a touch input equal to or greater than a first pressure, which is input on a first point of contents displayed on the display, is detected, the display device configures a first temporary area including the first point (S3310). The display can detect the touch input by including a touch recognizing layer in the display. The configuring of a first area including the first point can be performed based on a direction of a tangent line of a point where a moving direction of a sweep touch input and the first temporary area are in contact. In addition, if the display device detects the touch input equal to or greater than the first pressure by configuring a range of the first area in advance, the display device can configure the first area without configuring the first temporary area. In addition, the display device can control area of the first area in proportion to touch pressure.

If a sweep touch input swept to a direction of the first temporary area from a second point of the displayed content is detected, the display device can configure the first area including the first point and the second area including the second point based on the first temporary area and the moving direction of the sweep touch input (S3320).

The display device moves the second area according to a direction of a sweep touch input and displays an overlap area of the second area, which is overlapped with the first area, according to a moving distance of the second area using a predetermined scheme (S3330). The predetermined scheme may correspond to displaying a partial image included in the overlap area of the second area on a predetermined reduced area distinguished from both the first area and the second area. The display device can increase or decrease the number of the predetermined reduced areas according to the count of the sweep touch input. In particular, the display device can display the overlap area in a crease form. In addition, the predetermined scheme may correspond to displaying images included in the overlap area of the second area on the predetermined reduced area by reducing the images. In particular, the display device can display the overlap area in a curved scheme.

Subsequently, if a pinch-in touch input input on at least one of the first area and the second area is detected, the display device can zoom-out contents of the area in which the pinch-in touch input is detected. On the contrary, if a pinch-out touch input input on at least one of the first area and the second area is detected, the display device can zoom-in contents of the area in which the pinch-out touch input is detected.

The embodiments of the present invention provide the following advantages. For example, the mobile terminal can display a specific part of contents on a single screen. The mobile terminal can also control a direction of an overlapped area based on a gesture direction. Further, the mobile terminal can control the number of overlapped areas or a length of the overlapped areas in proportion to the number of gestures. Also, the mobile terminal can simply execute a command using a touch input equal to or greater than a predetermined pressure.

The above-described present invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). In addition, the computer may include a controller 180 of a terminal. While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A mobile terminal, comprising:
a display including a touch recognizing layer configured to recognize a touch input; and
a controller configured to:
display contents on the display,
in response to a touch input equal to or greater than a first pressure being input on a first point of the displayed contents, set a first temporary area containing the first point,
in response to a sweep touch input swept to a direction of the first temporary area from a second point of the displayed contents, set a first area containing the first point and a second area containing the second point based on the first temporary area and a moving direction of the sweep touch input,
move the second area according to the direction of the sweep touch input,
display an overlap area of the second area overlapped with the first area on the display according to a moving distance of the second area using a predetermined scheme, wherein the predetermined scheme corresponds to displaying a partial image contained in the overlap area of the second area on a predetermined reduced area distinguished from both the first area and the second area, and
increase a number of the predetermined reduced area according to a count of the sweep touch input.

2. The mobile terminal of claim 1, wherein the controller is configured to set the first area based on a tangent line direction of a point where the moving direction of the sweep touch input and the first temporary area are in contact.

3. The mobile terminal of claim 1, wherein the predetermined scheme corresponds to a scheme of displaying images contained in the overlap area of the second area on a predetermined reduced area by reducing the images.

4. The mobile terminal of claim 1, wherein the controller is configured to control a size of the first temporary area in proportion to a strength of the touch input input on the first point.

5. The mobile terminal of claim 1, wherein the controller is configured to control a moving speed of the second area in proportion to a strength of the sweep touch input on the second point.

6. The mobile terminal of claim 1, wherein in response to the sweep touch input being input on the overlap area of the second area, the controller is configured to control an area of the first area and an area of the second area by moving the overlap area of the second area based on the moving direction of the sweep touch input.

7. The mobile terminal of claim 1, wherein in response to a pinch-out touch input input on the overlap area of the second area, the controller is configured to unfold the overlap area of the second area.

8. The mobile terminal of claim 1, wherein in response to a pinch-in touch input input on at least one of the first area and the second area, the controller is configured to zoom-out contents of an area on which the pinch-in touch input is detected.

9. A mobile terminal, comprising:
a display including a touch recognizing layer configured to recognize a touch input; and
a controller configured to:
display contents on the display, wherein the contents correspond to map contents,
in response to a touch input equal to or greater than a first pressure being input on a first point of the displayed contents, set a first temporary area containing the first point,
in response to a sweep touch input swept to a direction of the first temporary area from a second point of the displayed contents, set a first area containing the first point and a second area containing the second point based on the first temporary area and a moving direction of the sweep touch input,
move the second area according to the direction of the sweep touch input,
display an overlap area of the second area overlapped with the first area on the display according to a moving distance of the second area, and
set the first point as a point of departure.

10. The mobile terminal of claim 9, wherein in response to the touch input equal to or greater than the first pressure being input on a third point of the second area, the controller is configured to set the third point as a destination and display a moving path on the display starting from the point of departure and arriving at the destination.

11. The mobile terminal of claim 10, wherein in response to the touch input equal to or greater than the first pressure being input on the first area or a fourth point of the second area, the controller is configured to set the third point or the fourth point as a stopover and search for a moving path connecting the first point, the third point and the fourth point with each other.

12. The mobile terminal of claim 10, further comprising:
a sensor configured to detect a shaking of the mobile terminal,
wherein in response to the shaking of the mobile terminal being equal to or greater than a first strength, the controller is configured to display a moving path on the display different from the displayed moving path.

13. The mobile terminal of claim 10, wherein in response to a sweep touch input equal to or greater than the first pressure being input on the point of departure or the destination, the controller is configured to delete the displayed moving path.

14. A method of controlling a mobile terminal, the method comprising:
displaying contents on a display including a touch recognizing layer configured to recognize a touch input;
in response to a touch input equal to or greater than a first pressure being input on a first point of the displayed contents, setting, via a controller, a first temporary area containing the first point;
in response to a sweep touch input swept to a direction of the first temporary area from a second point of the displayed contents, setting, via the controller, a first area containing the first point and a second area containing the second point based on the first temporary area and a moving direction of the sweep touch input;
moving, via the controller, the second area according to the direction of the sweep touch input;
displaying an overlap area of the second area overlapped with the first area on the display determined according to a moving distance of the second area using a predetermined scheme, wherein the predetermined scheme corresponds to displaying a partial image contained in the overlap area of the second area on a predetermined reduced area distinguished from both the first area and the second area; and
increasing a number of the predetermined reduced area according to a count of the sweep touch input.

15. The method of claim 14, further comprising:
setting the first area based on a tangent line direction of a point where the moving direction of the sweep touch input and the first temporary area are in contact.

16. The method of claim 14, wherein the predetermined scheme corresponds to a scheme of displaying images contained in the overlap area of the second area on a predetermined reduced area by reducing the images.

* * * * *